United States Patent
Li

(10) Patent No.: US 10,656,659 B2
(45) Date of Patent: May 19, 2020

(54) METHOD AND APPARATUS FOR LOCALIZATION AND MAPPING BASED ON RFID

(71) Applicant: GUANGZHOU AIROB ROBOT TECHNOLOGY CO., LTD., Guangzhou, Guangdong (CN)

(72) Inventor: Beichen Li, Guangdong (CN)

(73) Assignee: GUANGZHOU AIROB ROBOT TECHNOLOGY CO., LTD., Guangzhou (CN)

( * ) Notice: Subject to any disclaimer, the term of this patent is extended or adjusted under 35 U.S.C. 154(b) by 204 days.

(21) Appl. No.: 15/657,261

(22) Filed: Jul. 24, 2017

(65) Prior Publication Data

US 2017/0329336 A1 Nov. 16, 2017

Related U.S. Application Data

(63) Continuation of application No. PCT/CN2015/071361, filed on Jan. 22, 2015.

(51) Int. Cl.
| | |
|---|---|
| *G05D 1/02* | (2020.01) |
| *G01S 5/02* | (2010.01) |
| *G01S 13/74* | (2006.01) |
| *G01S 13/86* | (2006.01) |
| *G01S 17/02* | (2020.01) |
| *G01S 17/93* | (2020.01) |

(Continued)

(52) U.S. Cl.
CPC ............. *G05D 1/028* (2013.01); *G01S 5/02* (2013.01); *G01S 5/0252* (2013.01); *G01S 13/74* (2013.01); *G01S 13/865* (2013.01); *G01S 17/023* (2013.01); *G01S 17/936* (2013.01); *G05D 1/02* (2013.01); *G05D 1/0214* (2013.01); *G05D 1/0219* (2013.01); *G05D 1/0231* (2013.01); *G01S 13/931* (2013.01); *G05D 2201/0217* (2013.01); *G06K 7/10376* (2013.01)

(58) Field of Classification Search
None
See application file for complete search history.

(56) References Cited

U.S. PATENT DOCUMENTS

| | | | |
|---|---|---|---|
| 7,693,654 B1 * | 4/2010 | Dietsch | G01C 21/20 701/461 |
| 2014/0207374 A1 * | 7/2014 | Taylor, Jr. | G01C 21/16 701/470 |

FOREIGN PATENT DOCUMENTS

| | | |
|---|---|---|
| CN | 203376473 U | 1/2014 |
| CN | 102576063 B | 8/2016 |

\* cited by examiner

*Primary Examiner* — Jonathan M Dager
*Assistant Examiner* — Garrett F Evans

(57) ABSTRACT

The present invention discloses a method and an apparatus for localization and mapping based on RFID, applicable for real-time mapping of an area to be localized in which at least one RFID tag is arranged, the method comprises: taking a location of a first RFID tag as a coordinate origin of a coordinate system when information of the first RFID tag is obtained by a mobile electronic device which is moving along a certain trajectory for a first time; moving the mobile electronic device with the coordinate origin as a starting point to traverse the entire area to be localized, calculating coordinates of an obstacle based on a location of the mobile electronic device when the mobile electronic device detects the obstacle; constructing a map based on the recorded information and coordinates of the RFID tags and coordinates of each obstacle when the traversal has been finished.

19 Claims, 12 Drawing Sheets

(51) Int. Cl.
*G06K 7/10* (2006.01)
*G01S 13/931* (2020.01)

METHOD AND APPARATUS FOR LOCALIZATION AND MAPPING BASED ON RFID

CROSS-REFERENCE TO RELATED APPLICATIONS

The present application is a Continuation Application of PCT application No. PCT/CN2015/071361 filed on Jan. 22, 2015, the contents of which are hereby incorporated by reference.

FIELD OF THE INVENTION

The present invention relates to the simultaneous localization and mapping field, more particularly to a method and an apparatus for localization and mapping based on RFID (Radio Frequency Identification).

BACKGROUND OF THE INVENTION

The localization and mapping of mobile devices is a hot spot in the field of robot. There has been a practical solution to the self-localization of mobile devices in known environments and mapping with known locations of robots. However, in many environments the mobile device can't be localized by using global location system, moreover it is difficult or even impossible to obtain the map of the mobile device's working environment in advance. Hence the mobile device needs to build the map in a completely unknown environment under the condition that its position is uncertain, and use the map to locate and navigate autonomously. This is so-called simultaneous localization and mapping (SLAM).

According to the simultaneous localization and mapping (SLAM), the mobile device identifies characteristic indications in an unknown environment by utilizing sensors in the mobile device, and the global coordinates of the mobile device and the characteristic indication are estimated according to the relative position between the mobile device and the characteristic indication and the reading of the encoder.

So far, the most common exiting positioning techniques of automatic walking robots or devices are:

(1) GPS positioning; the basic principle of GPS positioning is based on instantaneous position of the satellite moving with high speed as a known starting data, and using the method of spatial distance resection to determine the location of the point to be measured.

(2) bar code positioning mode. To convert the bar code compiled according to certain rules into meaningful information, it is necessary to go through two processes of scanning and decoding. The color of the object is determined by the type of light it reflects, the white object can reflect the visible light of various wavelengths, the black object absorbs the visible light of various wavelengths, so when the light emitted by the bar code scanner light is reflected on the bar code, the reflected light is irradiated to the photoelectric converter within the bar code scanner, and the photoelectric converter converts reflected light signal into the corresponding electrical signal on the basis of different strength of the reflected light signal. According to different principles, the scanner can be divided into three types: light pen, CCD and laser. After being output to the amplifying circuit enhancement signals of the bar-code scanner, the electric signals are transmitted to the shaping circuit to convert the analog signals into digital signals. The width of the black bars and black bars is different, and hence the duration of the corresponding electrical signals is different. Then the decoder determines the number of bars and nulls by measuring the number of pulse digital electrical signals 0f 0 and 1. The width of the bar and the empty is determined by measuring the duration of the 0,1 signal. But the obtained data is still chaotic, in order to know the information contained in the bar code, it is necessary to convert the bar symbol into the corresponding number information and character information based on the corresponding coding rules (such as: EAN-8 yards). Finally, the details of the items will be identified through data processing and management by computer system.

The above-mentioned positioning technique applied in automatic walking robot or automatic walking equipment is relatively complex, each with different shortcomings:

1. GPS positioning is not practical due to signal problems in the room.

2. The bar code positioning mode is limited in usage occasions due to the fact that the bar codes are easily polluted and cannot be read.

Positioning and navigation technique of the mobile robot in the indoor environment has the characteristics of high precision and complicated environment for positioning, so the methods above are not applicable.

RFID (Radio Frequency Identification) radio frequency identification is a non-contact automatic identification technology, which identifies a target object automatically and acquires related data through radio frequency signal, without manual intervention, applicable in various severe environments, hence the RFID technology can identify high-speed moving objects and multiple labels simultaneously, and the operation is rapid and convenient. Therefore, it is necessary to combine this technology to improve the existing positioning and navigation method for mobile robots.

In the existing RFID-based positioning technique for automatic walking robot, for example, a Chinese utility model patent with application number of CN2013204818.2, discloses a RFID indoor positioning system which specifically comprises a plurality of electronic tags which are arranged in the positioning region in an equilateral triangle mode, and calculates and positions through wireless signal strength. Although the method is effective in locating in the indoor environment and with high position precision, but the shortcomings lies in the need for at least three electronic tags to transmit wireless signals, moreover the arrangement mode of the three electronic tags is fixed as an equilateral triangle shape, so the method is too limited and not very adaptable.

Another Chinese invention patent with application number of CN201080034870.0, has disclosed a RFID positioning system in which the position is determined by reading the RFID tag information which is attached to a certain position of a building. According to the method, it is no need to fix the arrangement mode of the three electronic tags an equilateral triangle shape, but information such as the size of a building needs to be accurately measured, and then the position information is written into the RFID tag through the RFID reader-writer, as a result the operation is complicated, and only by arranging a plurality of RFID tags can the positioning effect be realized.

SUMMARY OF THE INVENTION

The present invention aims to provide a method and an apparatus for localization and mapping based on RFID, which can effectively solve the problem that the exiting technique requires multiple RFID tags to realize localization and of which the operation is cumbersome.

The present invention provides a method for localization and mapping based on RFID, and the method comprises steps of:

taking a location of a first RFID tag as a coordinate origin of a coordinate system when information of the first RFID tag is obtained by a mobile electronic device which is moving along a certain trajectory for a first time, and recording the information of the first RFID tag and coordinate values thereof;

moving the mobile electronic device with the coordinate origin as a starting point to traverse the area to be localized, calculating and recording coordinate values of a location of an obstacle based on a moving direction and a moving distance of the mobile electronic device relative to the starting point each time the mobile electronic device detects the obstacle during the traversal;

constructing a map according to recorded information of the RFID tag and coordinate values thereof and the coordinate values of the location of each obstacle when the traversal has been finished.

According to another embodiment of the present invention, the number of the RFID tag is two or more, and each said RFID tag is correspondingly arranged at a specific position of the area to be localized, and the information of each said RFID tag comprises unique coding information used for distinguishing an absolute position thereof, the method further comprises step of:

calculating coordinate values of location of other RFID tag except the first RFID tag each time the mobile electronic device obtains information of the other RFID tag based on a moving direction and a moving distance of the mobile electronic device relative to the starting point during the traversal, and recording the information of the other RFID tag and the corresponding coordinate values.

According to another embodiment of the present invention, after constructing the map, the method further comprises steps of:

enabling the mobile electronic device to traverse the area to be localized for multiple times with the coordinate origin as the starting point, and correcting the coordinate values of each said RFID tag by using a correction algorithm based on the coordinate values of each said RFID tag obtained from traversal for each time;

correcting the constructed map based on corrected coordinate values.

According to another embodiment of the present invention, the information of each said RFID tag further comprises area coding information used for distinguishing an accessible area/a no-entry area, and a RFID tag with the area coding information of the no-entry area limits a specific area behind a boundary where the RFID tag is localized as the no-entry area, the method further comprises step of:

identifying the area coding information in the information of the RFID tag as the accessible area or as the no-entry area firstly when the mobile electronic device obtains the information of the RFID tag, and then enabling the mobile electronic device to continue to move on to avoid the no-entry area according to a preset avoiding strategy if the no-entry area is identified.

As an improvement of the above-described embodiment, when the traversal has been finished, during the map-constructing process based on recorded information of the RFID tag and the coordinate values thereof and the coordinate values of the location of each obstacle, making marks of the accessible area/no-entry area on the map being constructed according to the area coding information of each said RFID tag.

As an improvement of the above-described embodiment, the coordinate values of the location of the obstacle are calculated each time the mobile electronic device detects the obstacle in the following manners:

sensing the obstacle by using a collision sensor, and taking coordinate values of the mobile electronic device as the coordinate values of the location of the obstacle when the collision sensor senses a collision with the obstacle; or detecting the obstacle by using a laser sensor/an infrared sensor, and calculating the location of the obstacle relative to a current location of the mobile electronic device according to a calculation principle of laser/infrared distance when the laser sensor/the infrared sensor detects the obstacle, thus calculating the coordinate values of the location of the obstacle.

As an improvement of the above-described embodiment, the method further comprises step of: correcting each said moving direction and each said moving distance of the mobile electronic device relative to the starting point based on an angular velocity or/and an angle and an acceleration of the mobile electronic device; and coordinate values are obtained according to corrected moving direction and corrected moving distance of the mobile electronic device relative to the starting point.

As an improvement of the above-described embodiment, employing passive RFID tags as the RFID tags, and limiting that only when the mobile electronic device is closest to one of the RFID tags can the mobile electronic device obtain the information of the RFID tag, and taking a location of the mobile electronic device where the mobile electronic device obtains the information of the RFID tag as the location of the RFID tag.

As an improvement of the above-described embodiment, the location of each said RFID tag is determined in the following manners:

employing active RFID tags as the RFID tags, when the mobile electronic device has sensed the information of any one of the RFID tags, enabling the mobile electronic device to move in a direction in which RSSI of the RFID tag is gradually increasing until RSSI of the RFID tag sensed by the mobile electronic device is equal to or greater than a preset maximum RSSI value or the mobile electronic device collides with the RFID tag, and then taking a location of the mobile electronic device as the location of the RFID tag.

As an improvement of the above-described embodiment, the method further comprises steps of:

when the mobile electronic device has collided with an obstacle during the traversal, enabling the mobile electronic device to continue to advance to avoid the obstacle according to a preset collision strategy;

the preset collision strategy is preferably:

enabling the mobile electronic device to retreat by M cm and rotate to the left/right by N° when a collision occurs, wherein 0<M<20, 0<N<10;

the preset avoiding strategy comprises:

enabling the mobile electronic device to retreat by P cm and rotate to the left/right by Q° when the no-entry area is identified, wherein P is not less than the length of the boundary, $45 \leq Q \leq 90$.

As an improvement of the above-described embodiment, the preset avoiding strategy comprises:

enabling the mobile electronic device to retreat by P cm and rotate to the left/right by Q° when the no-entry area is identified, wherein P is not less than the length of the boundary, 45≤Q≤90.

As an improvement of the above-described embodiment, the mobile electronic device is a robot.

As an improvement of the above-described embodiment, the method is applicable for real-time mapping for an indoor area to be localized.

As an improvement of the above-described embodiment, the RFID tag is arranged on a left and/or right side wall of a door frame.

The present invention provides an apparatus for localization and mapping based on RFID, the apparatus is applicable for real-time mapping of an area to be localized in which at least one RFID tag is arranged, the apparatus for localization and mapping is a mobile electronic device and the mobile electronic device comprises:

a RFID tag information reading unit, configured to read information of the RFID tag;

a coordinate system constructing and recording unit, configured to take a location of a first RFID tag as a coordinate origin of a coordinate system when information of the first RFID tag is obtained by the RFID tag information reading unit in the mobile electronic device which is moving along a certain trajectory for a first time, and record the information of the first RFID tag and coordinate values thereof;

an encoder, configured to record a moving distance and a moving direction of the mobile electronic device relative to a starting point in real time when the mobile electronic device traverses the area to be localized with the coordinate origin as the starting point;

an obstacle detecting unit, configured to detect obstacles;

a first calculating unit, configured to calculate coordinate values of a location of each obstacle based on the moving direction and the moving distance of the mobile electronic device relative to the starting point recorded by the encoder when the mobile electronic device detects the obstacle, and send the calculated coordinate values to the coordinate system constructing and recording unit;

a map constructing unit, configured to construct a map according to the information of the RFID tag and coordinate values thereof and the coordinate values of the location of each obstacle recorded by the coordinate system constructing and recording unit.

As an improvement of the above-described embodiment, the number of the RFID tag is two or more, and each said RFID tag is correspondingly arranged at a specific position of the area to be localized, and the information of each said RFID tag comprises unique coding information used for distinguishing an absolute position thereof, the apparatus further comprises:

a second calculating unit, configured to calculate coordinate values of location of other RFID tag except the first RFID tag each time the mobile electronic device obtains information of the other RFID tag based on a moving direction and a moving distance of the mobile electronic device relative to the starting point during the traversal, and send the information of the other RFID tag and the corresponding coordinate values to the coordinate system constructing and recording unit.

As an improvement of the above-described embodiment, the apparatus further comprises:

a second correcting unit, configured to correct the coordinate values of each said RFID tag by using a correction algorithm after the mobile electronic device traverses the area to be localized for multiple times with the coordinate origin as the starting point according to the coordinate values of each said RFID tag obtained from traversal for each time, and send corrected coordinate values to the map constructing unit to correct the constructed map.

As an improvement of the above-described embodiment, the information of each said RFID tag further comprises area coding information used for distinguishing an accessible area/a no-entry area, and a RFID tag with the area coding information of the no-entry area limits a specific area behind a boundary where the RFID tag is localized as the no-entry area, the apparatus further comprises:

an area identifying unit, configured to identify the area coding information in information of the RFID tag as the accessible area or as the no-entry area when the mobile electronic device obtains the information of each said RFID tag; and an avoiding strategy unit, configured to enable the mobile electronic device to continue to move on to avoid the no-entry area according to a preset avoiding strategy if the area coding information is identified as the no-entry area by the area identifying unit.

As an improvement of the above-described embodiment, after finishing the traversal, during the map-constructing process based on recorded information of the RFID tag and the coordinate values thereof and the coordinate values of the location of each obstacle, the map constructing unit makes marks of the accessible area/no-entry area on the map being constructed according to the area coding information of each said RFID tag.

As an improvement of the above-described embodiment, the obstacle detecting unit comprises a collision sensor, a laser sensor or an infrared sensor;

and the first calculating unit takes calculated coordinate values of a current location of the mobile electronic device as the coordinate values of the location of an obstacle when the collision sensor senses a collision with the obstacle;

the laser sensor/the infrared sensor calculates the location of the obstacle relative to a current location of the mobile electronic device according to a calculation principle of laser/infrared distance when the laser sensor/infrared sensor detects the obstacle, which is send to the first calculating unit; the first calculating unit calculates the coordinate values of the location of the obstacle based on the calculated coordinate values of the current location of the mobile electronic device and the location of the obstacle relative to the current location of the mobile electronic device.

As an improvement of the above-described embodiment, the apparatus further comprises:

a gyro sensor or/and an electronic compass and an accelerometer, configured to record an angular velocity or/and an angle and an acceleration of the mobile electronic device in real time respectively when the mobile electronic device traverses the area to be localized with the coordinate origin as the starting point; and a first correcting unit, configured to correct each said moving direction and each said moving distance of the mobile electronic device relative to the starting point based on the angular velocity or/and the angle and the acceleration of the mobile electronic device;

the first calculating unit calculates the coordinate values of the location of each obstacle according to corrected moving direction and corrected moving distance of the mobile electronic device relative to the starting point.

As an improvement of the above-described embodiment, the apparatus further comprises:

a gyro sensor or/and an electronic compass and an accelerometer, configured to record an angular velocity or/and an angle and an acceleration of the mobile electronic device in real time respectively when the mobile electronic device traverses the area to be localized with the coordinate origin as the starting point; and a first correcting unit, configured to correct each said moving direction and each said moving distance of the mobile electronic device relative to the starting point based on the angular velocity or/and the angle and the acceleration of the mobile electronic device;

the first calculating unit calculates the coordinate values of each obstacle according to corrected moving direction and corrected moving distance of the mobile electronic device relative to the starting point;

the second calculating unit calculates the coordinate values of the locations of the other RFID tag according to the corrected moving direction and the corrected moving distance of the mobile electronic device relative to the starting point.

As an improvement of the above-described embodiment, employing passive RFID tags as the RFID tags, and limiting that only when the mobile electronic device is closest to one of the RFID tags can the mobile electronic device obtain the information of the RFID tag, and taking a location of the mobile electronic device where the mobile electronic device obtains the information of the RFID tag as the location of the RFID tag As an improvement of the above-described embodiment, employing active RFID tags as the RFID tags, when the mobile electronic device has sensed the information of one of the RFID tags, enabling the mobile electronic device to move in a direction in which RSSI of the RFID tag is gradually increasing until RSSI of the RFID tag sensed by the mobile electronic device is equal to or greater than a preset maximum RSSI value or the mobile electronic device collides with the RFID tag, and then taking a location of the mobile electronic device as the location of the RFID tag.

As an improvement of the above-described embodiment, the apparatus further comprises:

a collision strategy unit, configured to enable the mobile electronic device to continue to advance to avoid an obstacle when the mobile electronic device has collided with the obstacle during the traversal according to a preset collision strategy;

the preset collision strategy is preferably:

enabling the mobile electronic device to retreat by M cm and rotate to the left/right by N° when a collision occurs, wherein 0<M<20, 0<N<10.

As an improvement of the above-described embodiment, the preset avoiding strategy comprises:

enabling the mobile electronic device to retreat by P cm and rotate to the left/right by Q° when the no-entry area is identified, wherein P is not less than the length of the boundary, $45 \leq Q \leq 90$.

As an improvement of the above-described embodiment, the mobile electronic device is a robot.

As an improvement of the above-described embodiment, the apparatus is applicable for real-time mapping for an indoor area to be localized.

As an improvement of the above-described embodiment, the RFID tag is arranged on a left and/or right side wall of a door frame of a room.

As an improvement of the above-described embodiment, a fixing groove is arranged on a left side and/or right side wall of a door frame, and the RFID tag is set in the fixing groove.

The present invention provides an intelligent mobile device, and the intelligent mobile device comprises a mobile apparatus and the apparatus for localization and mapping based on RFID as described above.

Compared with the exiting technique, the method and apparatus for localization and mapping based on RFID disclosed by the present invention is achieved by arranging at least one RFID tag in the area to be localized, and taking the location (of the RFID tag) where the first RFID tag is sensed by the mobile electronic device which moves for the first time as the coordinate origin of a coordinate system, then during the process of the mobile electronic device is moved to traverse the area to be localized with the coordinate origin as the starting point, calculating and recording the coordinate values of the location of an obstacle based on the moving direction and the moving distance of the mobile electronic device relative to the starting point each time the mobile electronic device detects the obstacle, when the traversal has been finished, constructing a map on the basis of the recorded information of the RFID tags and the coordinate values thereof and the coordinate values of the location of each obstacle. Therefore, The present invention needs only one or more RFID tags to realize the localization and mapping of the area to be localized, and the method is simple, so as to solve the problem that the exiting technique requires multiple RFID tags to realize localization and of which the operation is cumbersome, and has the advantages of low cost, simple operation and effective technical results.

DETAILED DESCRIPTION OF ILLUSTRATED EMBODIMENTS

The technical solutions of the embodiments according to the present invention are clearly and fully described as below with reference to the accompanying drawings in the embodiments of the present invention. Apparently, the embodiments to be described are merely a part rather than all of the embodiments of the present invention. All other embodiments obtained by persons with ordinary skills in the art based on the embodiments of the present invention without creative efforts shall fall within the protection scope of the present invention.

Figure 1:
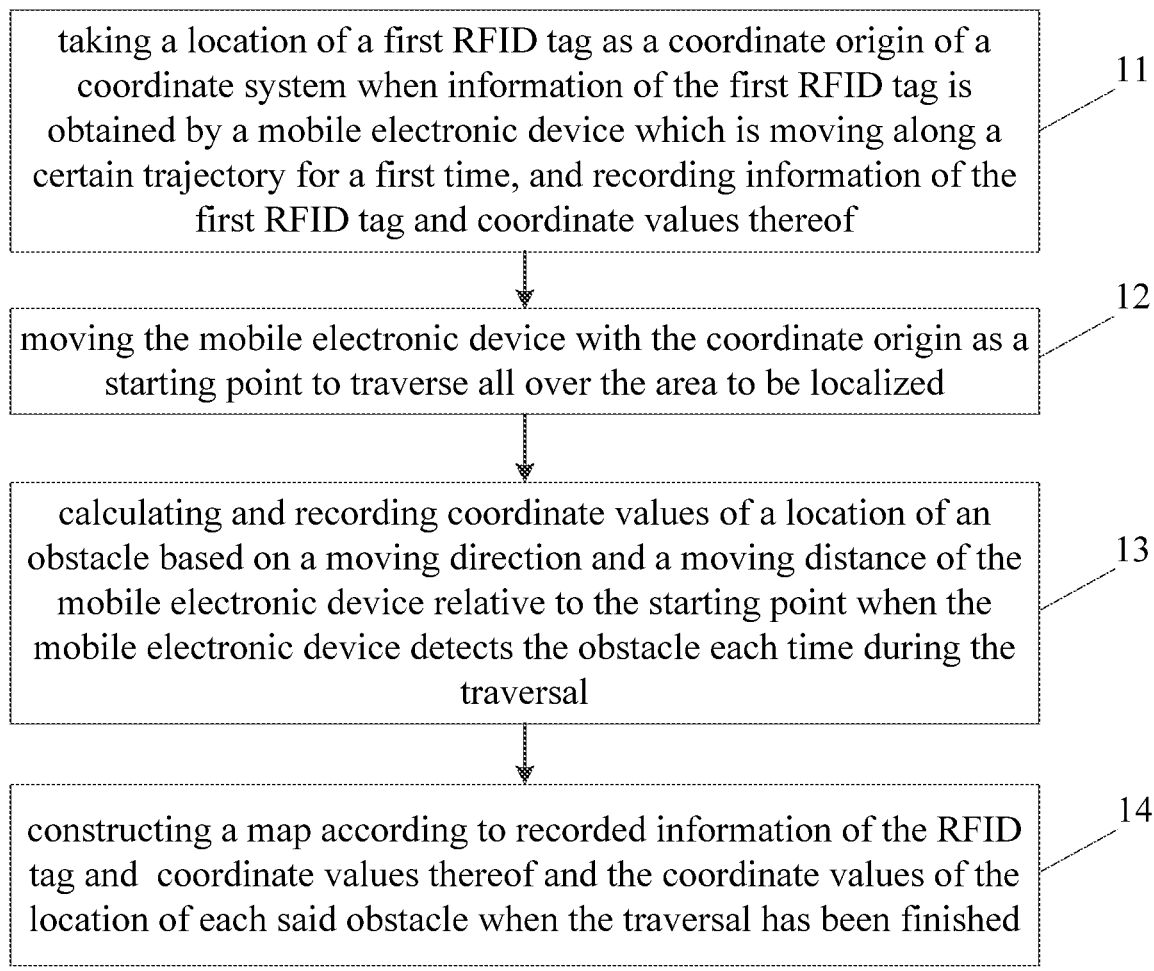
FIG. 1 is a flowchart of a method for localization and mapping based on RFID according to the first embodiment of the present invention.

Referring to FIG. 1, it is a flowchart of a method for localization and mapping based on RFID according to the first embodiment of the present invention. The method for localization and mapping based on RFID is applicable for real-time mapping of an area to be localized in which at least one RFID tag is arranged by utilizing a mobile electronic device, the mobile electronic device can be, for example, a robot.

The method for localization and mapping based on RFID according to the present embodiment comprises:

step 11, taking a location of a first RFID tag as a coordinate origin of a coordinate system when information of the first RFID tag is obtained by a mobile electronic device which is moving along a certain trajectory for a first time, and recording the information of the first RFID tag and coordinate values thereof;

step 12, moving the mobile electronic device with the coordinate origin as a starting point to traverse the area to be localized;

step 13, calculating and recording coordinate values of a location of an obstacle based on a moving direction and a moving distance of the mobile electronic device relative to the starting point each time the mobile electronic device detects the obstacle during the traversal;

step 14, constructing a map according to recorded information of the RFID tag and coordinate values thereof and the coordinate values of the location of each said obstacle when the traversal has been finished.

In step 11, after the RFID tag is arranged in at least one specific position/any position of the area to be localized and mapped, it is necessary to have the mobile electronic traversing the entire area to obtain the relevant information in the area, thus realizing localization and mapping for the entire area. At the beginning of the first traversal, the mobile electronic device can be enabled to move along a certain trajectory until the mobile electronic device senses the information of the first RFID tag, then the mobile electronic device takes the location of the first RFID tag as the coordinate origin of a coordinate system composed of X-axis and Y-axis, and records the information of the first RFID tag and coordinate values thereof (coordinate origin).

As can be understood, the location of the first RFID tag when the information of the first RFID tag is obtained is taken as the coordinate origin of the coordinate system composed of the X axis and the Y axis in order to facilitate calculation and composition. However, the location of the first RFID tag is not limited as the coordinate origin of the coordinate system composed of the X-axis and the Y-axis, and may be marked as other reference points, so as to have a reference function to facilitate recording information of other points. Wherein the RFID tag is generally used in conjunction with a RFID tag information reader, and the RFID tag can transmit information to the RFID tag information reader with signal and energy excitation from the RFID tag information reader. Thus, in this step, the mobile electronic device of the present embodiment can read the information of the RFID tag through the RFID tag information reader.

How the mobile electronic device determines the specific location of the RFID label when reading the information of the RFID label through the RFID tag information reader will be described in detail as below.

Approach 1: each RFID tag adopts a passive RFID tag, and it is limited that only when the mobile electronic equipment is closest to a RFID tag can the mobile electronic device sense (obtain) the information of the RFID tag.

In this way, When the RFID tag information reader on the mobile electronic device can obtain the information of the RFID tag, it can be indicated that a location of the mobile electronic device is close enough to the RFID tag (the distance between each other can be negligible), hence the current location of the mobile electronic device when the mobile electronic device obtains the information of the RFID tag can be taken as the location of the RFID tag.

As can be understood, the reading range of the RFID tag information reader on the mobile electronic device (as small as possible) can be adjusted to achieve the approach 1.

Approach 2: each RFID tag adopts a active RFID tag; during the mobile electronic device's moving process, the mobile electronic device is enabled to move in a direction in which RSSI of the RFID tag is gradually increasing when the mobile electronic device has sensed (reach a certain reading range) the information of any one of the RFID tags; as can be understood, since that the information the mobile electronic device has sensed is from not less than one RFID tag, the mobile electronic device is enabled to move in a direction of the RFID tag with the largest RSSI, and the location of the mobile electronic device is taken as the location of the RFID tag when the RSSI of the RFID tag sensed by the mobile electronic device is equal to or greater than a preset maximum RSSI value or the mobile electronic device collides with the RFID tag (the collision can be sensed by a collision sensor).

As can be understood, in addition to the two above-mentioned approaches, the location of the RFID tag can be determined in other approaches by the mobile electronic device when the information of the RFID tag is read through the RFID tag information reader, which is not limited to the disclosed approaches.

In steps 12-13, the mobile electronic device is moved to traverse the entire area to be localized with the coordinate origin the starting point when it is determined that the location of the first RFID tag is taken as the coordinate origin. Furthermore, when the mobile electronic device starts to move from the starting point, the real-time calculation of the moving direction and the moving distance of the mobile electronic device relative to the starting point is started up (for example, moving path and relative position and angle of the robot can be recorded in real time through an encoder installed on a driving wheel axle of the robot, so that the location (including the distance and the direction) of the mobile electronic device relative to the starting point can be obtained through calculation, and the coordinate values of the mobile electronic device are obtained as well). Each time the mobile electronic device detects the obstacle during the traversal, the coordinate values of the location of the obstacle can be calculated in the following approaches:

Approach 1: The obstacle is sensed by using a collision sensor, and a current coordinate values of the mobile electronic device is taken as the coordinate values of the location of the obstacle when the collision sensor senses a collision with the obstacle.

Approach 2: the obstacle is detected by using a laser sensor/an infrared sensor, and the location of the obstacle relative to the current location of the mobile electronic device is calculated on the basis of a calculation principle of laser/infrared distance when the laser sensor/infrared sensor detects the obstacle, thus the coordinate values of the location of the obstacle is calculated.

Moreover, an additional collision strategy is set in the present embodiment, that is, when the mobile electronic device has collided with an obstacle during the traversal, the mobile electronic device is made continue to advance to avoid the obstacle according to the preset collision strategy.

According to a preferable embodiment of the present invention, the preset collision strategy comprises: when the mobile electronic device senses a collision with the obstacle through, for example, a collision sensor, the mobile electronic device will perform an intelligent analysis to determine the modes of further movement. For example, the mobile electronic device may choose to retreat by greater than 0 and less than 20 cm and rotate to the right or left by 1-10 degrees according to a specific environmental pattern of the area to be localized. When the mobile electronic device is in a confined space, the mobile electronic device may choose to retreat by greater than 0 and less than 2 cm. Furthermore, the mobile electronic device chooses a larger angle of rotation, for example, the rotation angle of 2 degrees or even 10 degrees, when collision points of consecutive rotations for 3 times by 1 degree are in a plane.

As can be understood, in addition to the preset collision strategy disclosed herein, the collision strategy according to the present embodiment can also adopt other approaches, which is not limited thereto.

Therefore, according the preset collision strategy, the mobile electronic device is moved continually to obtain the coordinate values of other RFID tags and obstacles, and the traversal for one time is accomplished until the entire area to be localized has been traversed. As can be understood, all feature information (including the location information of the location of the RFID tag and the location of each obstacle) of the area to be localized is recorded after the mobile electronic device has accomplished the traversal for one time.

In step 14, a map is constructed on the basis of the recorded information of the RFID tags and the coordinate values thereof and the coordinate values of the location of each obstacle after the mobile electronic device has accomplished the traversal for one time. The more recorded information, the richer and more detailed the constructed map will be. For example, when the mobile electronic device collides with an obstacle, the coordinate values of the obstacle are recorded, so that when the mobile electronic device which is placed in the indoor environment has traversed the entire room, the coordinate values of all the obstacles can be recorded continuously, and the obstacles which surrounds as periphery and at the same time makes a circle can be considered as a wall, so that a barrier-free region area, an obstacle area and a wall area of the room can be separated to construct the map of the whole room.

As can be understood, the constructed map is 2D map, and the mobile electronic device (for example, a robot) may navigate according to the constructed map.

According to a preferable embodiment of the present invention, to further improve the accuracy of the constructed map, the moving direction and the moving distance of the mobile electronic device relative to the starting point can be corrected based on an angular velocity or/and an angle and an acceleration of the mobile electronic device; so that each obtained coordinate value is corrected. For example, if the moving direction and the moving distance of the robot relative to the starting point are recorded in real time by an encoder installed on a driving wheel axle of the robot, there exit cumulative error in the calculation process of the encoder due to skidding, uncertain distance of contact points between the two driving wheels and the ground or the like. Therefore, according to the present embodiment the mobile electronic device records the angular velocity and/or the angle and the acceleration of the mobile electronic device in real time, for example, preferably by using a gyro sensor and/or an electronic compass and an accelerometer, respectively, then the moving direction and moving distance of the mobile electronic device relative to the starting point recorded by the encoder in real time is corrected based on the angular velocity and/or angle and acceleration recorded by the gyro sensor and/or the electronic compass and the accelerometer in real time, so that each coordinate value calculated based on the corrected moving direction and moving distance of the mobile electronic device relative to the starting point and is made more accurate, so that the map based on the coordinate values is made more accurate.

It can be seen that the method for localization and mapping requires only one or more RFID tags to realize the localization and mapping for the area to be localized, and the method is simple, so as to solve the problem that the exiting technique requires multiple RFID tags to realize localization and the operation is cumbersome, and the method possesses the technical effects of low cost, simple and effective operation.

Figure 2:
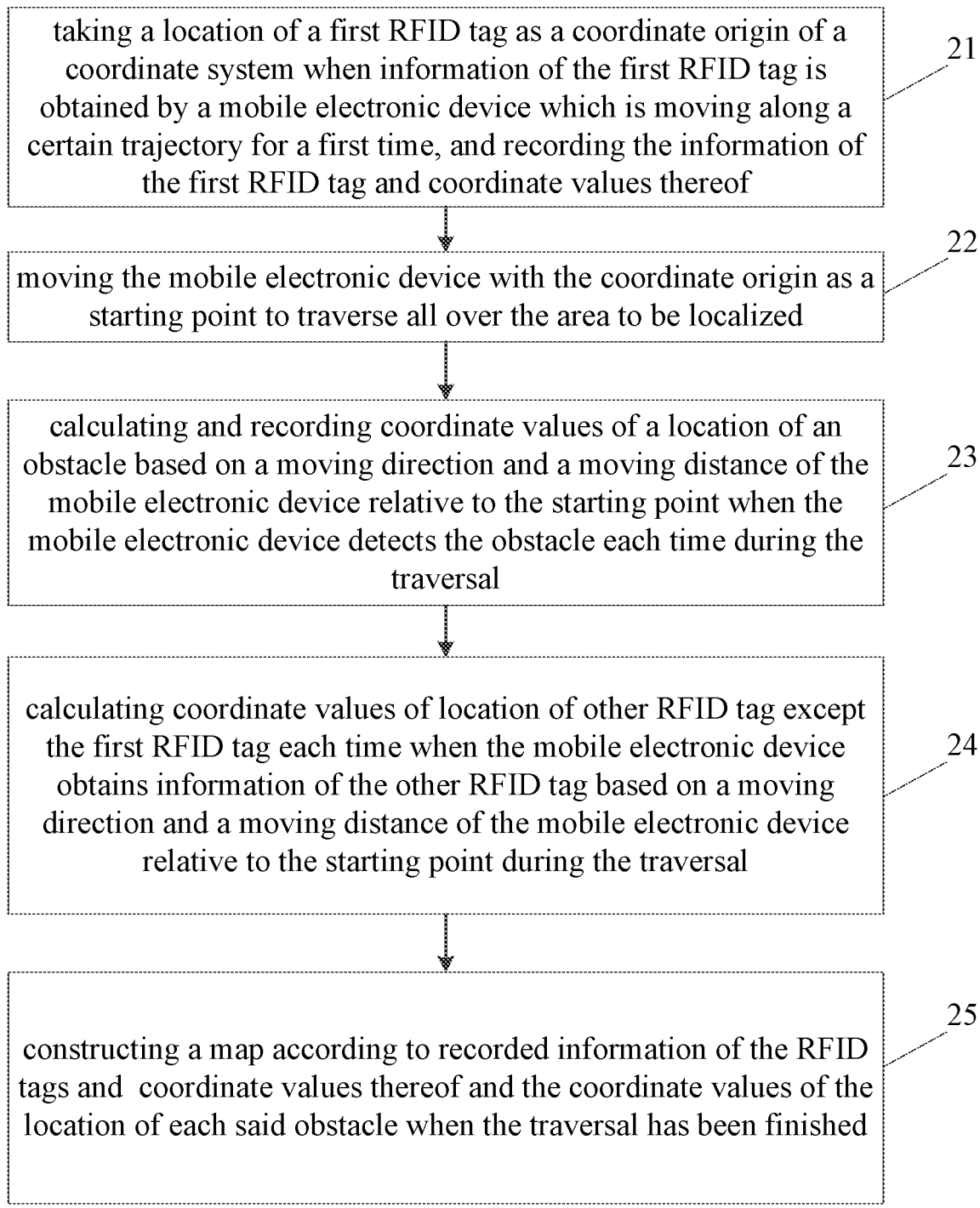
FIG. 2 is a flowchart of a method for localization and mapping based on RFID according to the second embodiment of the present invention.

Referring to FIG. 2, it is a flowchart of a method for localization and mapping based on RFID according to the second embodiment of the present invention. The method is applicable for real-time mapping of an area to be localized in which two or more RFID tags are arranged by utilizing a mobile electronic device. Wherein each RFID tag is correspondingly arranged at a specific position of the area to be localized, and information of each RFID tag comprises unique coding information used for distinguishing an absolute position thereof. The mobile electronic device can be, for example, a robot.

The method for localization and mapping based on RFID according to the present embodiment comprises:

step 21, taking a location of a first RFID tag as a coordinate origin of a coordinate system when information of the first RFID tag is obtained by a mobile electronic device which is moving along a certain trajectory for a first time, and recording the information of the first RFID tag and coordinate values thereof;

step 22, moving the mobile electronic device with the coordinate origin as a starting point to traverse the area to be localized;

step 23, calculating and recording coordinate values of a location of an obstacle based on a moving direction and a moving distance of the mobile electronic device relative to the starting point each time the mobile electronic device detects the obstacle during the traversal;

step 24, calculating coordinate values of location of other RFID tags except the first RFID tag each time the mobile electronic device obtains information of the other RFID tag based on a moving direction and a moving distance of the mobile electronic device relative to the starting point during the traversal;

step 25, constructing a map according to recorded information of the RFID tags and coordinate values thereof and the coordinate values of the location of each said obstacle when the traversal has been finished.

As can be understood, steps 21-23 and step 25 in the present embodiment are basically consistent with steps 11-13 and step 14 as shown in FIG. 1, which will not be repeated thereto.

Different from the first embodiment, since the method of the present embodiment is applicable to localize the area to be localized with two or more RFID tags, and each RFID tag is arranged at a specific position of the area to be localized, and the information of each RFID tag comprises unique coding information used for distinguishing the absolute position, therefore, during the mobile electronic device's traversal, in addition to calculating and recording the coordinate values of the location of the obstacle each time an obstacle is detected by the mobile electronic device, the coordinate values of the locations of the other RFID tags except the first RFID tag obtained by the mobile electronic device each time are calculated as well, that is, step 24.

How the mobile electronic device determines the specific locations of the other RFID tags when the information of the other RFID tags is read through the RFID tag information reader is referred to the related description of the first embodiment, which will not be repeated thereto.

As can be understood, the information of the RFID tag obtained by the mobile electronic device referred to herein mainly contains unique encoding information for distinguishing absolute position thereof. For example, when at least two RFID tags are placed at different specific positions (for example, room 1, room 2, . . . ) of the area to be localized, it is necessary to determine and distinguish the specific location (absolute location) where the RFID tag is located by the unique encoding information in the information of the RFID tag, for example, the RFID tag is located in room 1 or room 2 or the like. In general, for passive RFID tags, each tag will generally have its own unique number, which can be used as encoding information for distinguish absolute position thereof, and the passive RFID tag is placed at the specific position to identify the specific position. Therefore, the absolute position where the RFID tag is located can be identified and then determined by obtaining the unique encoding information from the information of each RFID tag.

Figure 11:
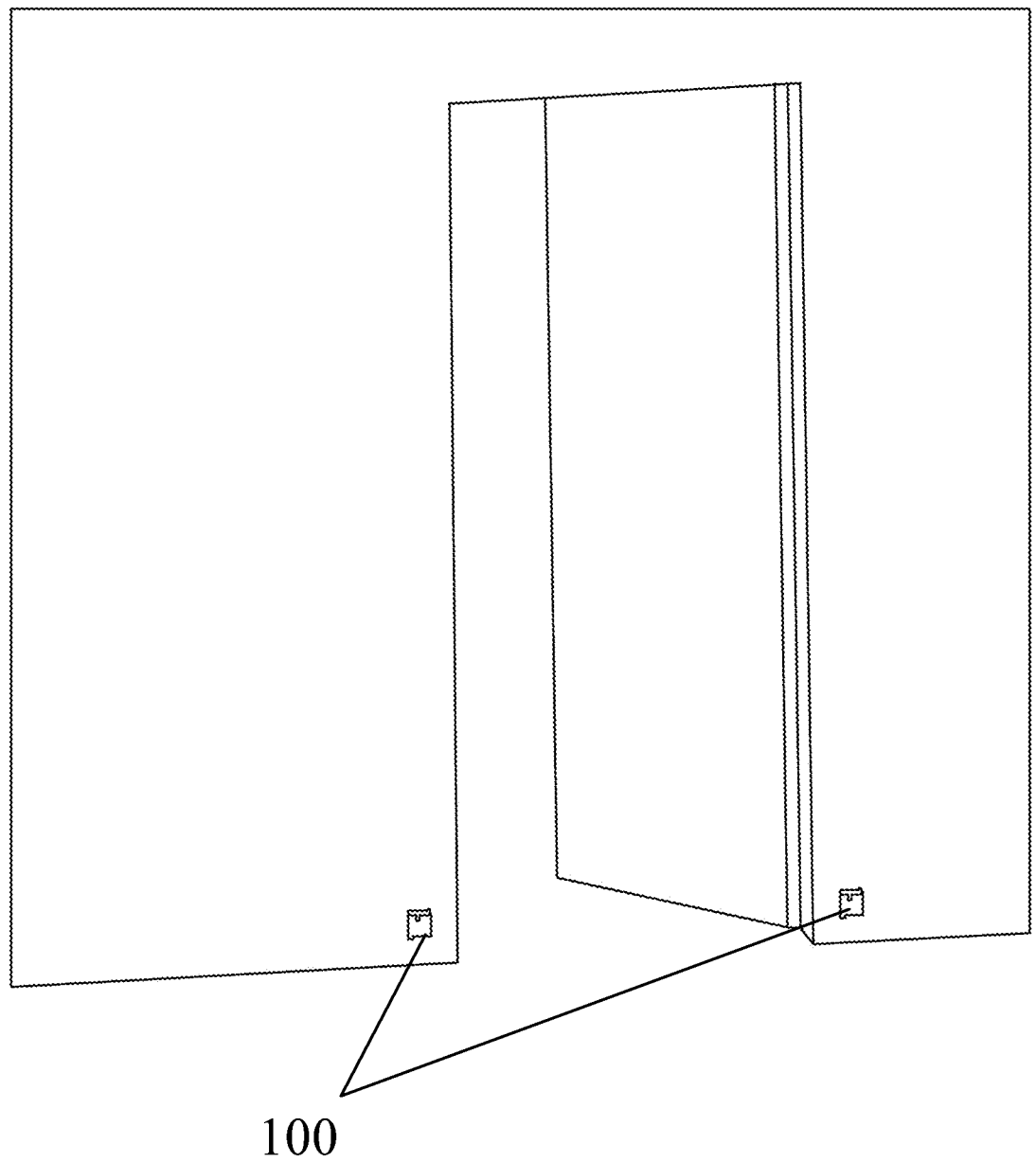
FIG. 11 and FIG. 12 show structural schematic diagrams of placing a RFID label in a fixing groove fixed on the wall.
Figure 12:
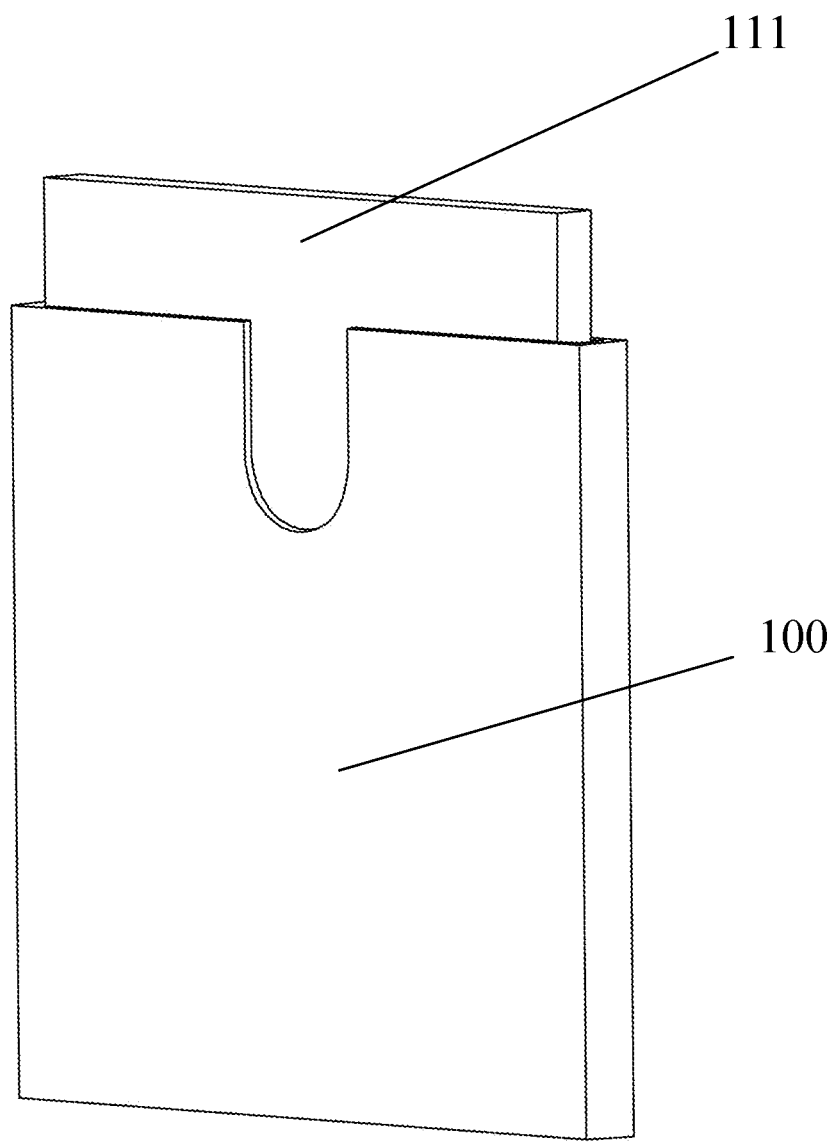

As can be understood, the method for localization and mapping based on RFID according to the present embodiment is applicable for real-time mapping for the indoor area to be localized. When the indoor environment is positioned, it is preferable to place one RFID tag 111 on a wall on left and/or right side of door frame in each room, as shown in FIG. 11; as can be understood that the RFID tag 111 can be fixed on the wall through magnet or the like. Preferably a fixing groove 100 is arranged on the wall on the left side and/or the right side of the door frame, and the RFID tag 111 is set in the fixing groove 100, as shown in FIG. 12.

In this way, the mobile electronic device can realize navigating and identifying of the absolute position based on the unique encoding information in the information of each RFID tag after the map construction is accomplished based on the recorded information of each RFID tag and the coordinate values thereof and the coordinate values of the location of each obstacle. For example, when the robot is required to traverse the room 2 for one time, the absolute position of the room 2 (namely, the location of the RFID tag) can be determined based on the unique encoding information of the RFID tag placed on the left and/or right side wall of the door frame in the room 2 and the mobile electronic device navigates to arrive in the room 2 based on the relative coordinate values (both direction and distance relative to the coordinates origin) of the location of the RFID tag on the constructed map.

In addition, the mobile device (the robot) is enabled to know where it is located based on the unique encoding information in the information of each RFID tag. For example, a cleaning robot, which is required to clean a plurality of rooms, can determine which room it is located in by identifying the unique coding information in the information of the corresponding RFID tag of each room, so as to avoid multiple cleanings for the same room and reduce repeated work.

Figure 3:
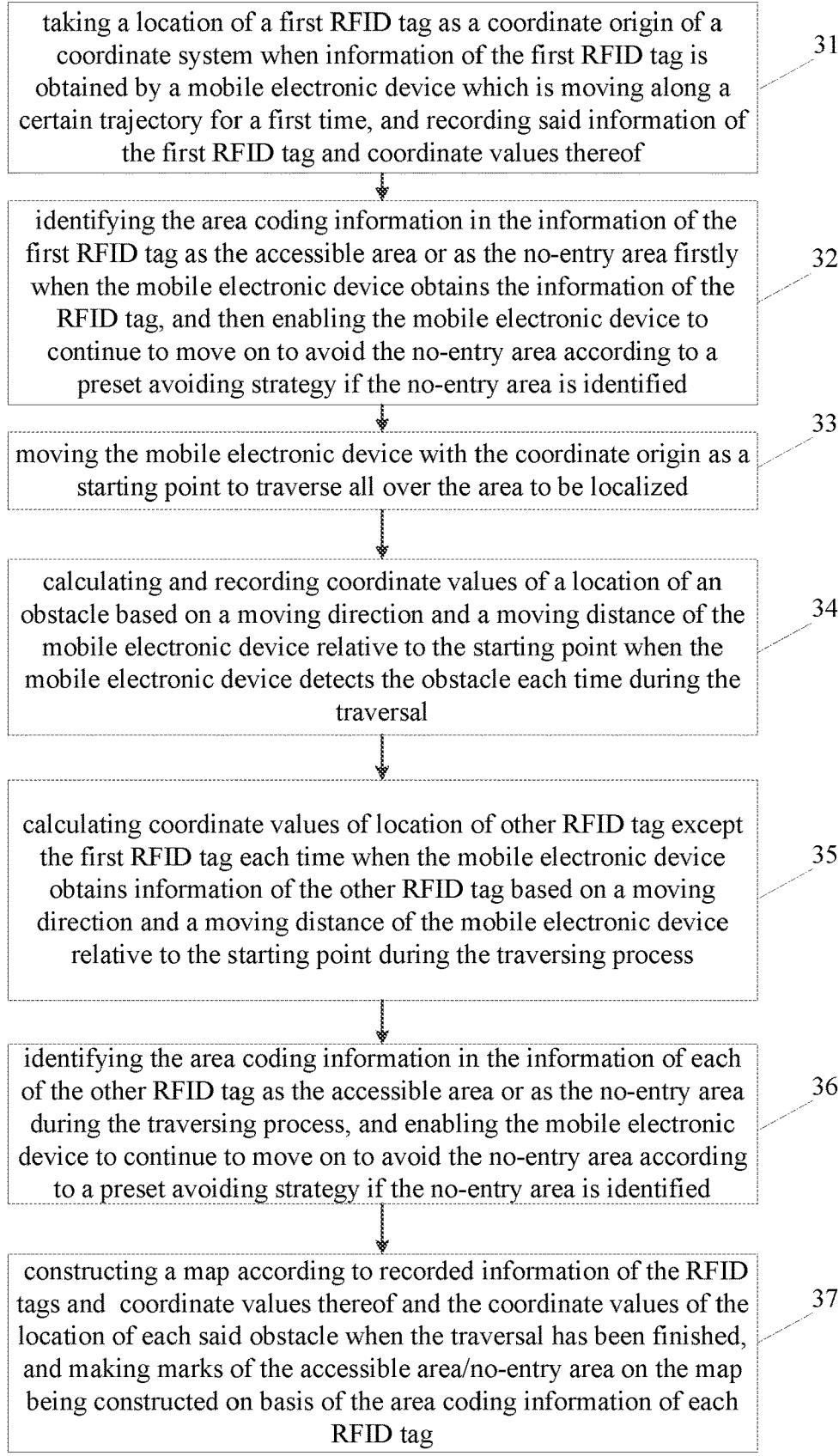
FIG. 3 is a flowchart of a method for localization and mapping based on RFID according to the third embodiment of the present invention.

Referring to FIG. 3, it is a flowchart of a method for localization and mapping based on RFID according to the third embodiment of the present invention. The method is applicable for real-time mapping of an area to be localized in which two or more RFID tags are arranged by utilizing a mobile electronic device. Wherein each RFID tag is correspondingly arranged at a specific position of the area to be localized, and the information of each RFID tag comprises unique coding information used for distinguishing an absolute position thereof and area coding information used for distinguishing an accessible area/a no-entry area, and a RFID tag with the area coding information of the no-entry area limits a specific area behind a boundary where the RFID tag is localized as the no-entry area. The mobile electronic device can be, for example, a robot.

The method for localization and mapping based on RFID according to the present embodiment comprises:

step 31, taking a location of a first RFID tag as a coordinate origin of a coordinate system when information of the first RFID tag is obtained by a mobile electronic device which is moving along a certain trajectory for a first time, and recording the information of the first RFID tag and coordinate values thereof;

step 32, identifying the area coding information in the information of the first RFID tag as the accessible area or as the no-entry area firstly when the mobile electronic device obtains the information of the RFID tag, and then enabling the mobile electronic device to continue to move on to avoid the no-entry area according to a preset avoiding strategy if the no-entry area is identified;

step 33, moving the mobile electronic device with the coordinate origin as a starting point to traverse the area to be localized;

step 34, calculating and recording coordinate values of a location of an obstacle based on a moving direction and a moving distance of the mobile electronic device relative to the starting point each time the mobile electronic device detects the obstacle during the traversal;

step 35, calculating coordinate values of location of other RFID tag except the first RFID tag each time the mobile electronic device obtains information of the other RFID tag based on a moving direction and a moving distance of the mobile electronic device relative to the starting point during the traversal;

step 36, identifying the area coding information in the information of each of the other RFID tag as the accessible area or as the no-entry area during the traversal, and enabling the mobile electronic device to continue to move on to avoid the no-entry area according to a preset avoiding strategy if the no-entry area is identified;

step 37, constructing a map according to recorded information of the RFID tags and coordinate values thereof and the coordinate values of the location of each said obstacle when the traversal has been finished, and making marks of the accessible area/no-entry area on the map being constructed on basis of the area coding information of each RFID tag.

It can be seen that the present embodiment adds a function on the basis of the embodiment 2, that is, solving the problem of the automatic identification of the no-entry area (also referred to as virtual wall). The traditional method to solve the problem of the robot identification of the no-entry area mainly adopts the following approaches:

One approach is that an infrared emitting device is set on a boundary of the expected no-entry area and a robot will not cross the boundary if detecting the infrared rays, which is proposed by irobot Company. The disadvantage of the approach is that the infrared emission device needs to be installed with a battery, so as to cause some inconvenience for users, on the other hand, the device is placed near the boundary, so that the device may move and thus fail to function if the device is touched by domestic pets or the like.

Another approach is using magnetic stripe as a boundary proposed by Neato Company, which requires users to attach the magnetic stripe to the boundary of the no-entry area, which is identified by using Hall sensors. The disadvantage of the approach lies in that the magnetic stripe attached to ground affects the ground appearance. On the other hand, if users want to replace the no-entry area, it is not convenient to take off the magnetic stripe.

The area coding information used for distinguishing the accessible area/no-entry area is arranged in the information of each RFID tag according to the present embodiment, wherein the RFID tag with the area coding information of the no-entry area limits the specific area behind the boundary where the RFID tag is localized as the no-entry area. In this way, when the mobile device identifies the area coding information in the RFID tag, it can be identified. The mobile electronic device is enabled to continue to move on to avoid the no-entry area according to the preset avoiding strategy if the no-entry area is identified. In addition, when the traversal has been finished, marks of the accessible area/no-entry area are made on the map being constructed on basis of the area coding information of each RFID tag, for the benefit of navigation.

As can be understood that the relation comparison table for different area coding information of the RFID tag representing the accessible area/no-entry area can be set in advance in the mobile device, so that when the area coding information in the information of each RFID tag is acquired, the accessible area or no-entry area can be identified according the comparison table.

Wherein, the preset avoiding strategy in the present embodiment is preferably: making the mobile electronic device retreat by P cm and rotate to the left/right by Q° when the no-entry area is identified, wherein P is not less than the length of the boundary, $45 \leq Q \leq 90$. Based on the preset avoiding strategy, it basically guarantees that the mobile electronic device can continue to advance to avoid the obstacle.

Furthermore, the boundary between the accessible area and no-entry area can be identified in the following manners: when the mobile device judges that the area coding information in the tag represents the no-entry area, the mobile device is moved to find obstacles (the wall) and barrier-free area on the left and right side of the tag, and the extension line of the wall is the boundary between the accessible area and no-entry area.

As can be understood, in addition to the avoiding strategy disclosed herein, the avoiding strategy of the present embodiment can also adopt other approaches, which is not limited thereto.

When applying the method for indoor localization and mapping according to the present embodiment, it is preferable to place one RFID tag on a left and/or right side wall of door frame in the room. Specifically, a fixing groove may be set on the wall of left side and/or the right side of the door frame in the room, and the RFID tag is placed in the fixing groove.

It can be seen that, compared with the virtual wall technique according to the exiting technique, the embodiment of the present invention writes the area coding information used for distinguishing the accessible area and no-entry area in the information of each RFID tag (in the fixing groove of the room door frame for example), so that the mobile device can determine the area is accessible after obtaining and identifying the area coding information of the RFID tag. Therefore, the cost is low, and the overall appearance will not be affected, and it is easy to replace tags according to the present embodiment.

Figure 4:
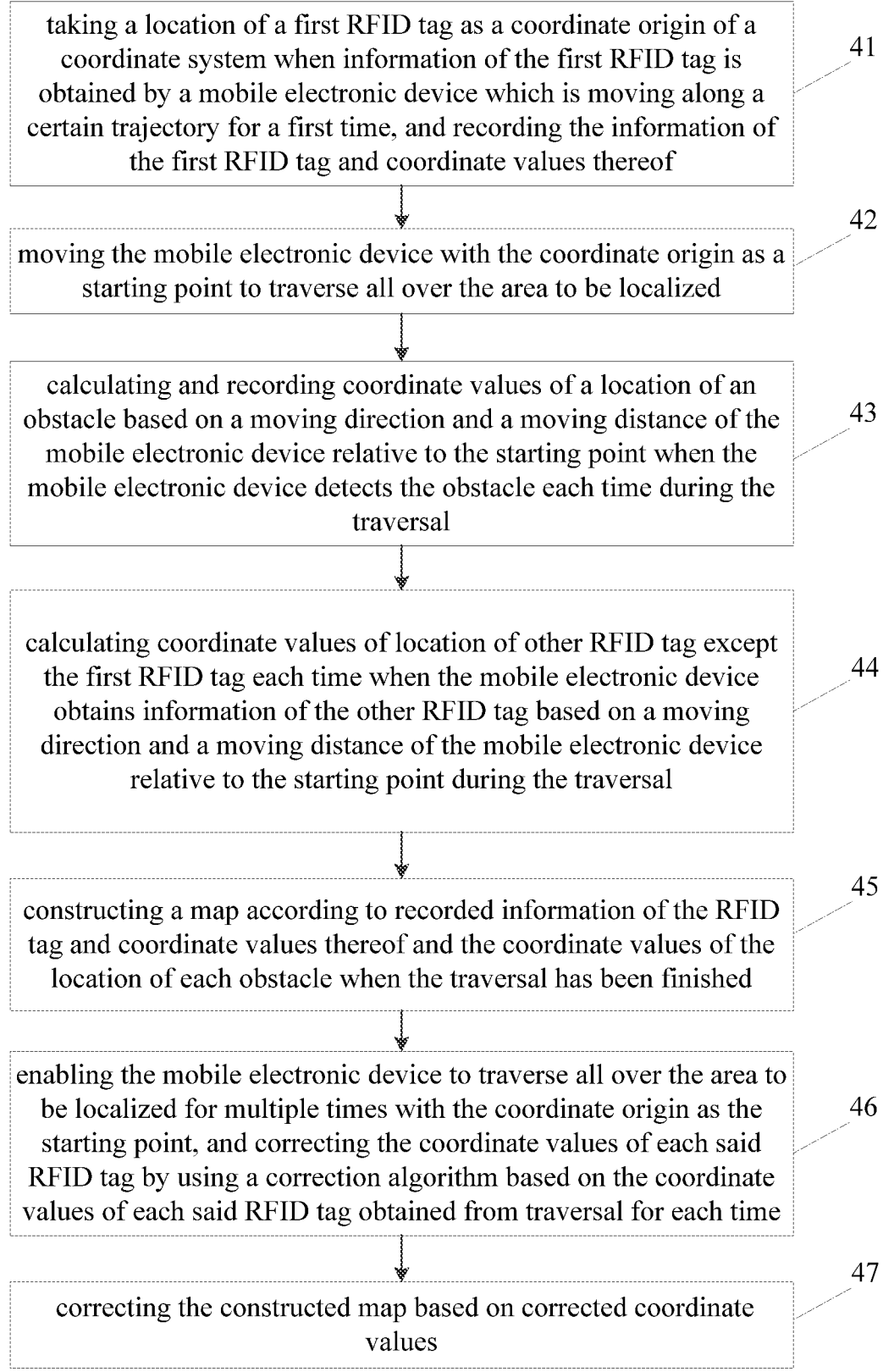
FIG. 4 is a flowchart of a method for localization and mapping based on RFID according to the fourth embodiment of the present invention.

Referring to FIG. 4, it is a flowchart of a method for localization and mapping based on RFID according to embodiment 1 of the present invention. The method is applicable for real-time mapping of an area to be localized in which two or more RFID tags are arranged by utilizing a mobile electronic device. Wherein each RFID tag is correspondingly arranged at a specific position of the area to be localized, and information of each RFID tag comprises unique coding information used for distinguishing an absolute position thereof. The mobile electronic device can be, for example, a robot.

The method for localization and mapping based on RFID according to the present embodiment comprise:

step 41, taking a location of a first RFID tag as a coordinate origin of a coordinate system when information of the first RFID tag is obtained by a mobile electronic device which is moving along a certain trajectory for a first time, and recording the information of the first RFID tag and coordinate values thereof;

step 42, moving the mobile electronic device with the coordinate origin as a starting point to traverse the area to be localized;

step 43, calculating and recording coordinate values of a location of an obstacle based on a moving direction and a moving distance of the mobile electronic device relative to the starting point when the mobile electronic device detects the obstacle each time during the traversal;

step 44, calculating coordinate values of location of other RFID tag except the first RFID tag each time the mobile electronic device obtains information of the other RFID tag based on a moving direction and a moving distance of the mobile electronic device relative to the starting point during the traversal;

step 45, constructing a map according to recorded information of the RFID tag and coordinate values thereof and the coordinate values of the location of each obstacle when the traversal has been finished;

step 46, enabling the mobile electronic device to traverse the area to be localized for multiple times with the coordinate origin as the starting point, and correcting the coordinate values of each said RFID tag by using a correction algorithm based on the coordinate values of each said RFID tag obtained from traversal for each time;

step 47, correcting the constructed map based on corrected coordinate values.

It can be seen that on the basis of the second embodiment the present embodiment further corrects the location of the RFID tags through the correction algorithm according to the coordinate values of the RFID tags obtained from traversal for multiple times, that is, steps 46 to 47.

Specifically, due to cumulative errors of the encoder or for other reasons, the coordinates of the RFID tag obtained by the traversal for one time are inevitably erroneous, resulting in an inaccurate map. Therefore, after the map has been constructed, the coordinate values of each RFID tag are obtained for multiply times in the way that the mobile device traverses for multiply times, and then the coordinate values of each RFID tag are corrected by the recursive algorithm. The more times the mobile device traverses for, the more accurate the calculated coordinate values of the RFID tag will be, until the final errors will be reduced to negligible. Finally, the constructed map is corrected based on the corrected coordinate values.

Therefore, the present embodiment provides the technical scheme that the coordinate values of each RFID tag are obtained for multiply times from traversal for multiply times, and then the coordinate values of each RFID tag are corrected by a recursive algorithm and the constructed map is corrected based on the corrected coordinate values, which further eliminates the cumulative error of the mobile device, thereby improving the accuracy of the constructed map.

As can be understood that steps of traversing for multiply times to correct the coordinate values of each RFID tag may be added in the third embodiment, that is, steps 46 to 47.

Figure 5:
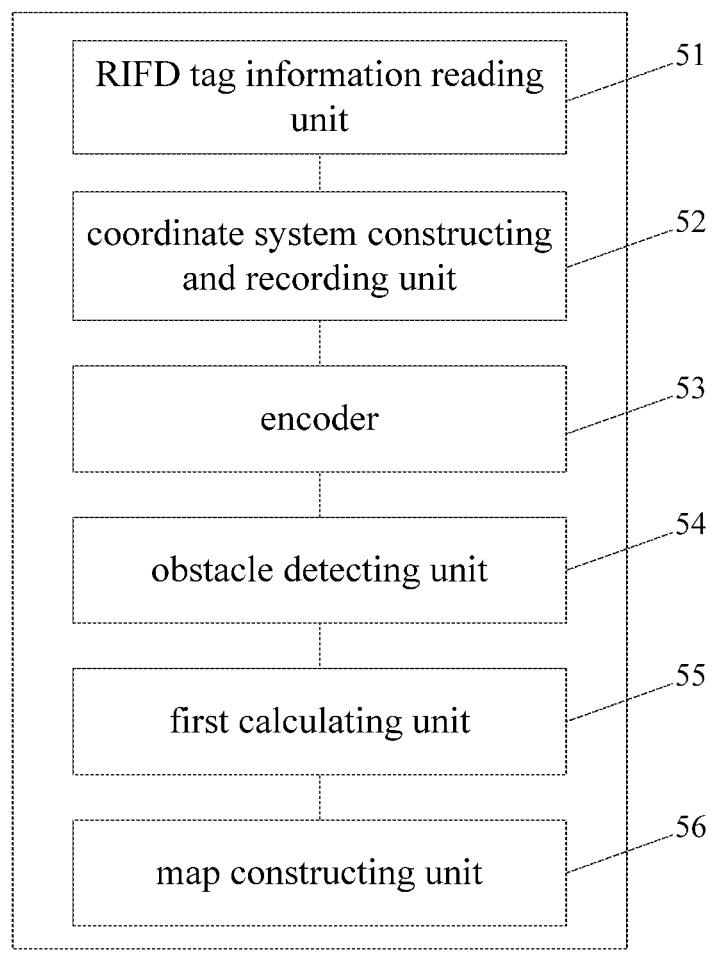
FIG. 5 is a composition block diagram of an apparatus for localization and mapping based on RFID according to the fifth embodiment of the present invention.

Referring to FIG. 5, it is a composition block diagram of an apparatus for localization and mapping based on RFID according to the fifth embodiment of the present invention. The apparatus for localization and mapping based on RFID is mobile electronic device or installed in a mobile electronic device, which is applicable for real-time mapping of an area to be localized in which at least one RFID tag is arranged, the mobile electronic device can be, for example, a robot.

The apparatus for localization and mapping based on RFID comprises:

a RFID tag information reading unit 51, configured to read information of the RFID tag;

a coordinate system constructing and recording unit 52, configured to take a location of a first RFID tag as a coordinate origin of a coordinate system when information of the first RFID tag is obtained by the RFID tag information reading unit 51 in the mobile electronic device which is moving along a certain trajectory for a first time, and record the information of the first RFID tag and coordinate values thereof;

an encoder 53, configured to record a moving distance and a moving direction of the mobile electronic device relative to a starting point in real time when the mobile electronic device traverses the area to be localized with the coordinate origin as the starting point;

an obstacle detecting unit 54, configured to detect obstacle;

a first calculating unit 55, configured to calculate coordinate values of location of each obstacle based on a moving direction and a moving distance of the mobile electronic device relative to the starting point recorded by the encoder 53 when the mobile electronic device detects the obstacle, and send the calculated coordinate values to the coordinate system constructing and recording unit 52;

a map constructing unit 56, configured to construct a map according to the information of the RFID tag and coordinate values thereof and the coordinate values of the location of each said obstacle recorded by the coordinate system constructing and recording unit 52.

The operation principle and working process of the apparatus for localization and mapping based on RFID according to present embodiment can be referred to the first embodiment, which will not be repeated thereto.

Wherein the obstacle detecting unit 54 comprises a collision sensor, a laser sensor or an infrared sensor:

The obstacle is sensed by using a collision sensor, and the current coordinate values of the mobile electronic device are taken as the coordinate values of the location of the obstacle when the collision sensor senses a collision with the obstacle;

The collision sensor components include, but are not limited to, eccentric hammer sensors, ball-type crash sensors, roller-type expansion sensors, mercury-switched crash sensors, piezoresistive effect type crash sensors, piezoelectric effect type impact sensors, and microswitches and the like.

The obstacle is detected by using a laser sensor/infrared sensor, and the location of the obstacle relative to the current location of the mobile electronic device is calculated on the basis of a calculation principle of laser/infrared distance when the laser sensor/infrared sensor detects the obstacle, thus the coordinate values of the location of the obstacle is calculated.

According to the present embodiment, preferably, the mobile device further comprises: a collision strategy unit, configured to enable the mobile electronic device to continue to advance to avoid the obstacle when the mobile electronic device has collided with an obstacle during the traversal according to a preset collision strategy;

The operation principle and working process of the collision strategy unit can be referred to the first embodiment.

Figure 6:
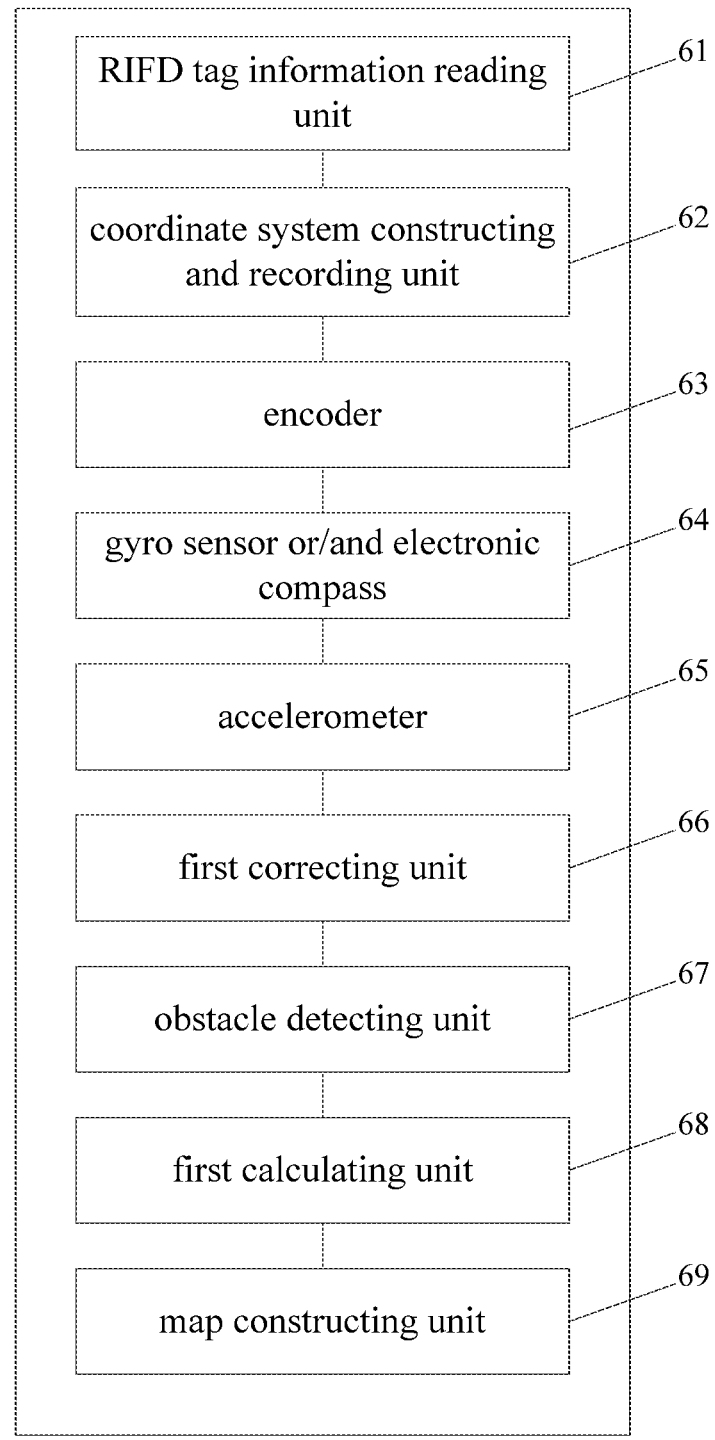
FIG. 6 is a composition block diagram of an apparatus for localization and mapping based on RFID according to the sixth embodiment of the present invention.

According to another preferable embodiment of the present invention, referring to FIG. 6, the apparatus for localization and mapping based on RFID is a mobile electronic device or installed in a mobile electronic device according to the sixth embodiment, which is applicable for real-time mapping of an area to be localized in which at least one RFID tag is arranged by utilizing a mobile electronic device, the mobile electronic device can be, for example, a robot.

The apparatus for localization and mapping based on RFID comprises:

a RFID tag information reading unit 61, configured to read information of the RFID tag;

a coordinate system constructing and recording unit 62, configured to take a location of a first RFID tag as a coordinate origin of a coordinate system when information of the first RFID tag is obtained by the RFID tag information reading unit 61 in the mobile electronic device which is moving along a certain trajectory for a first time, and record the information of the first RFID tag and coordinate values thereof;

an encoder 63, configured to record a moving distance and a moving direction of the mobile electronic device relative to a starting point in real time when the mobile electronic device traverses the area to be localized with the coordinate origin as the starting point a gyro sensor or/and an electronic compass 64, configured to record an angular velocity or/and an angle of the mobile electronic device in real time;

an accelerometer 65, configured to record an acceleration of the mobile electronic device in real time;

a first correcting unit 66, configured to correct each said moving direction and each said moving distance of the mobile electronic device relative to the starting point based on the angular velocity or/and the angle and the acceleration of the mobile electronic device;

an obstacle detecting unit 67, configured to detect obstacle;

a first calculating unit 68, configured to calculate coordinate values of a location of each obstacle based on corrected moving direction and corrected moving distance of the mobile electronic device relative to the starting point when the mobile electronic device detects the obstacle, and send calculated coordinate values to the coordinate system constructing and recording unit;

a map constructing unit 69, configured to construct a map according to the information of the RFID tag and coordinate values thereof and the coordinate values of the location of each said obstacle recorded by the coordinate system constructing and recording unit.

It can be seen that on the basis of the fifth embodiment, the present embodiment adds the gyro sensor or/and the electronic compass and the accelerometer, which are configured to record the angular velocity or/and the angle and the acceleration of the mobile electronic device in real time respectively so as to correct the moving direction and the moving distance of the mobile electronic device relative to the starting point, and calculate the coordinate values of based on the corrected moving direction and the moving distance, thereby correcting each obtained coordinate value. Wherein, the gyro includes, but are not limited to, wire gyro, electrostatic gyro, laser gyro, fiber optic gyro, micromechanical gyro or the like.

Therefore, the present embodiment can eliminate exiting cumulative errors from the calculation process of the encoder 63 due to skidding, uncertain distance of contact points between two driving wheels and ground according to the driving wheel with the encoder 63 installed, or the like.

Figure 7:
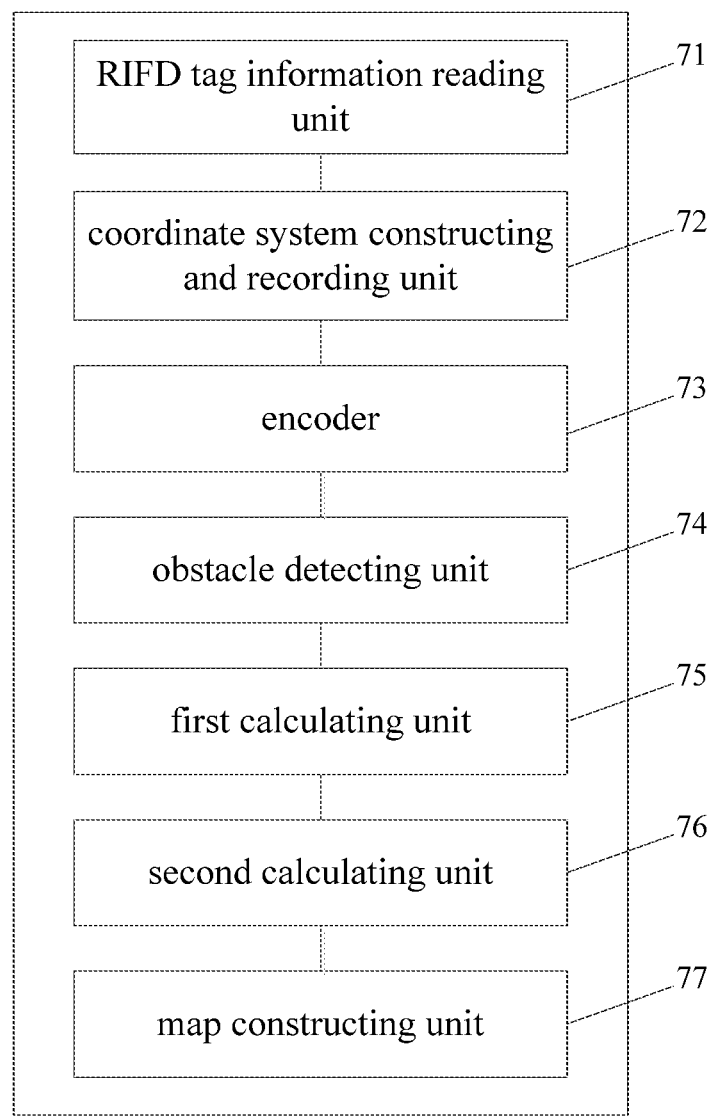
FIG. 7 is a composition block diagram of an apparatus for localization and mapping based on RFID according to the seventh embodiment of the present invention.

Referring to FIG. 7, it is a composition block diagram of an apparatus for localization and mapping based on RFID according to the seventh embodiment of the present invention. The apparatus is mobile electronic device or installed in a mobile electronic device, which is applicable for real-time mapping of an area to be localized in which two or more RFID tags are arranged. Wherein each RFID tag is correspondingly arranged at a specific position of the area to be localized, and information of each RFID tag comprises unique coding information used for distinguishing the absolute position thereof. The mobile device can be, for example, a robot.

The apparatus for localization and mapping based on RFID comprises:

a RFID tag information reading unit 71, configured to read information of the RFID tag;

a coordinate system constructing and recording unit 72, configured to take a location of a first RFID tag as a coordinate origin of a coordinate system when information of the first RFID tag is obtained by the RFID tag information reading unit 71 in the mobile electronic device which is moving along a certain trajectory for a first time, and record the information of the first RFID tag and coordinate values thereof;

an encoder 73, configured to record a moving distance and a moving direction of the mobile electronic device relative to a starting point in real time when the mobile electronic device traverses the area to be localized with the coordinate origin as the starting point;

an obstacle detecting unit 74, configured to detect obstacle;

a first calculating unit 75, configured to calculate coordinate values of a location of each obstacle based on a moving direction and a moving distance of the mobile electronic device relative to the starting point recorded by the encoder 73 when the mobile electronic device detects the obstacle, and send the calculated coordinate values to the coordinate system constructing and recording unit 72;

a second calculating unit 76, configured to calculate coordinate values of location of other RFID tag except the first RFID tag each time the mobile electronic device obtains information of the other RFID tag based on a moving direction and a moving distance of the mobile electronic device relative to the starting point recorded by the encoder 73, and send the information of the other RFID tag and the corresponding coordinate values to the coordinate system constructing and recording unit 72;

a map constructing unit 77, configured to construct a map according to the information of the RFID tag and coordinate values thereof and the coordinate values of the location of each said obstacle recorded by the coordinate system constructing and recording unit 72.

The operation principle and working process of the apparatus for localization and mapping based on RFID according to the present embodiment can be referred to the second embodiment, which will not be repeated thereto.

As can be understood that the apparatus for localization and mapping based on RFID according to the present embodiment can further comprise the gyro sensor or/and electronic compass 64, the accelerometer 65 and the first correcting unit 66 according to the sixth embodiment, so as to correct the moving direction and the moving distance of the mobile electronic device relative to the starting point based on the angular velocity or/and the angle and the acceleration of the mobile electronic device recorded in real time by the gyro sensor or/and electronic compass and the accelerometer respectively, and calculate the coordinate values of based on the corrected moving direction and the moving distance, thereby correcting each obtained coordinate value.

Figure 8:
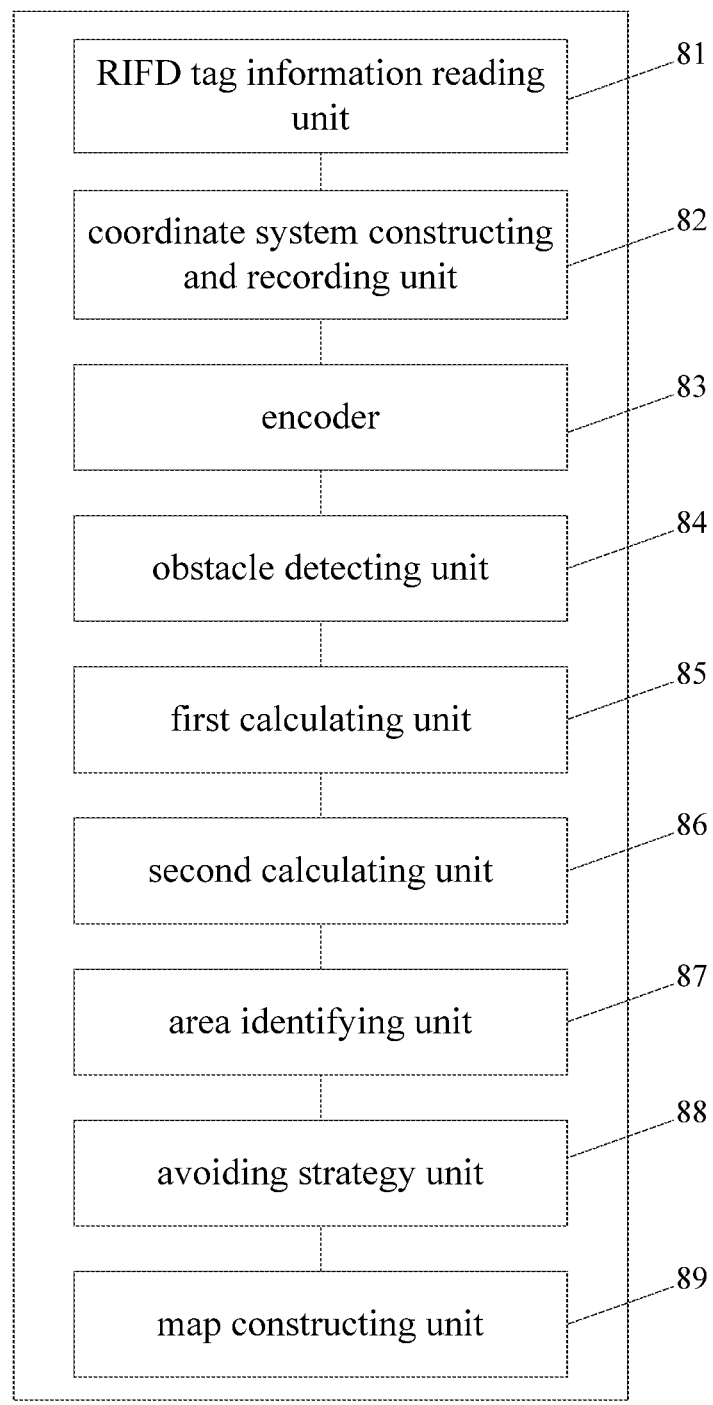
FIG. 8 is a composition block diagram of an apparatus for localization and mapping based on RFID according to the eighth embodiment of the present invention.

Referring to FIG. 8, it is a composition block diagram of an apparatus for localization and mapping based on RFID according to the eighth embodiment of the present invention. The apparatus is mobile electronic device or installed in a mobile electronic device, which is applicable for real-time mapping of an area to be localized in which two or more RFID tags are arranged. Wherein each RFID tag is correspondingly arranged at a specific position of the area to be localized, and information of each RFID tag comprises unique coding information used for distinguishing an absolute position thereof and area coding information used for distinguishing an accessible area/a no-entry area, wherein a RFID tag with the area coding information of the no-entry area limits a specific area behind a boundary where the RFID tag is localized as the no-entry area. The mobile device can be, for example, a robot.

The apparatus for localization and mapping based on RFID comprises:

a RFID tag information reading unit 81, configured to read information of the RFID tag;

a coordinate system constructing and recording unit 82, configured to take a location of a first RFID tag as a coordinate origin of a coordinate system when information of the first RFID tag is obtained by the RFID tag information reading unit 81 in the mobile electronic device which is moving along a certain trajectory for a first time, and record the information of the first RFID tag and coordinate values thereof;

an encoder 83, configured to record a moving distance and a moving direction of the mobile electronic device relative to a starting point in real time when the mobile electronic device traverses the area to be localized with the coordinate origin as the starting point;

an obstacle detecting unit 84, configured to detect obstacle;

a first calculating unit 85, configured to calculate coordinate values of a location of each obstacle based on a moving direction and a moving distance of the mobile electronic device relative to the starting point recorded by the encoder 83 when the mobile electronic device detects the obstacle, and send the calculated coordinate values to the coordinate system constructing and recording unit 82;

a second calculating unit 86, configured to calculate coordinate values of location of other RFID tag except the first RFID tag each time the mobile electronic device obtains information of the other RFID tag based on the moving direction and a moving distance of a mobile electronic device relative to the starting point recorded by the encoder 83, and send the information of the other RFID tag and the corresponding coordinate values to the coordinate system constructing and recording unit 82;

an area identifying unit 87, configured to identify the area coding information in the information of the RFID tag as the accessible area or as the no-entry area when the RFID tag information reading unit 81 obtains the information of each said RFID tag; as can be understood that the relation comparison table for different area coding information of the RFID tag representing the accessible area/no-entry area can be set in advance in the area identifying unit 87, so that when the area coding information in the information of each of the other RFID tag is acquired, the accessible area or no-entry area can be identified according the comparison table;

an avoiding strategy unit 88, configured to enable the mobile electronic device to continue to move on to avoid the no-entry area according to a preset avoiding strategy if the area coding information is identified as the no-entry area by the area identifying unit 87;

a map constructing unit 89, configured to construct a map according to the information of the RFID tag and coordinate values thereof and the coordinate values of the location of each said obstacle recorded by the coordinate system constructing and recording unit 82, and make marks of the accessible area/no-entry area on the map being constructed according to the area coding information of each said RFID tag.

The apparatus for localization and mapping based on RFID according to the present embodiment solves the problem of the automatic identification of the no-entry area (also referred to as virtual wall), of which the operation principle and working process can be referred to the third embodiment.

As can be understood that the apparatus for localization and mapping based on RFID according to the present embodiment can further comprises the gyro sensor or/and electronic compass 64, the accelerometer 65, and the first correcting unit 66 according to the sixth embodiment, so as to correct the moving direction and the moving distance of the mobile electronic device relative to the starting point based on the angular velocity or/and the angle and the acceleration of the mobile electronic device recorded in real time by the gyro sensor or/and electronic compass and the accelerometer respectively, and calculate the coordinate values based on the corrected moving direction and the moving distance, thereby correcting each obtained coordinate value.

Figure 9:
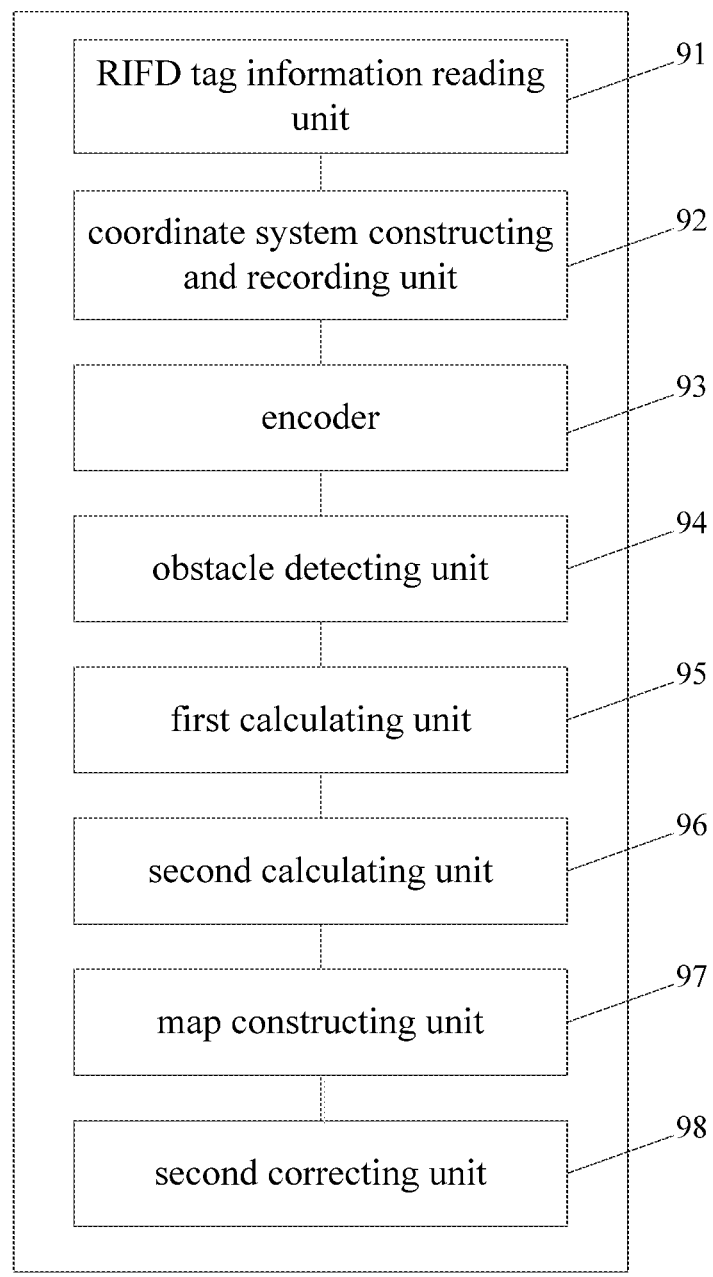
FIG. 9 is a composition block diagram of an apparatus for localization and mapping based on RFID according to the ninth embodiment of the present invention.

Referring to FIG. 9, it is a composition block diagram of an apparatus for localization and mapping based on RFID according to the ninth embodiment of the present invention. The apparatus is mobile device or installed in a mobile device, which is applicable for real-time mapping of an area to be localized in which two or more RFID tags are arranged. Wherein each RFID tag is correspondingly arranged at a specific position of the area to be localized, and information of each RFID tag comprises unique coding information used for distinguishing an absolute position thereof. The mobile device can be, for example, a robot.

The apparatus for localization and mapping based on RFID comprises:

a RFID tag information reading unit 91, configured to read information of the RFID tag;

a coordinate system constructing and recording unit 92, configured to take a location of a first RFID tag as a coordinate origin of a coordinate system when information of the first RFID tag is obtained by the RFID tag information reading unit 91 in the mobile electronic device which is moving along a certain trajectory for a first time, and record the information of the first RFID tag and coordinate values thereof;

an encoder 93, configured to record a moving distance and a moving direction of the mobile electronic device relative to a starting point in real time when the mobile electronic device traverses the area to be localized with the coordinate origin as the starting point;

an obstacle detecting unit 94, configured to detect obstacle;

a first calculating unit 95, configured to calculate coordinate values of a location of each said obstacle based on a moving direction and a moving distance of the mobile electronic device relative to the starting point recorded by the encoder 93 when the mobile electronic device detects the obstacle, and send the calculated coordinate values to the coordinate system constructing and recording unit 92;

a second calculating unit 96, configured to calculate coordinate values of location of other RFID tag except the first RFID tag each time the mobile electronic device obtains information of the other RFID tags based on a moving direction and a moving distance of the mobile electronic device relative to the starting point recorded by the encoder 93, and send the information of the other RFID tag and the corresponding coordinate values to the coordinate system constructing and recording unit 92;

a map constructing unit 97, configured to construct a map according to information of the RFID tags and coordinate values thereof and the coordinate values of the location of each obstacle recorded by the coordinate system constructing and recording unit 92; and a second correcting unit 98, configured to correct the coordinate values of each RFID tag by using a correction algorithm after the mobile electronic device traverses the area to be localized for multiple times with the coordinate origin as the starting point according to the coordinate values of each said RFID tag obtained from traversal for each time, and send corrected coordinate values to the map constructing unit to correct constructed map.

The present embodiment adds the second correcting unit 98 on basis of the seventh embodiment, according to which the coordinate values of each RFID tag are obtained for multiply times in the way that the mobile device traverses for multiply times, and then the coordinate values of each RFID tag are corrected by the recursive algorithm. The more times the mobile device traverses for, the more accurate the calculated coordinate values of the RFID tag will be, until the final error will be reduced to negligible. Finally, the constructed map is corrected based on the corrected coordinate values by the map constructing unit 97. Thereby exiting cumulative error from the mobile device traversing for one time is eliminated, and the accuracy of the constructed map is improved.

Figure 10:
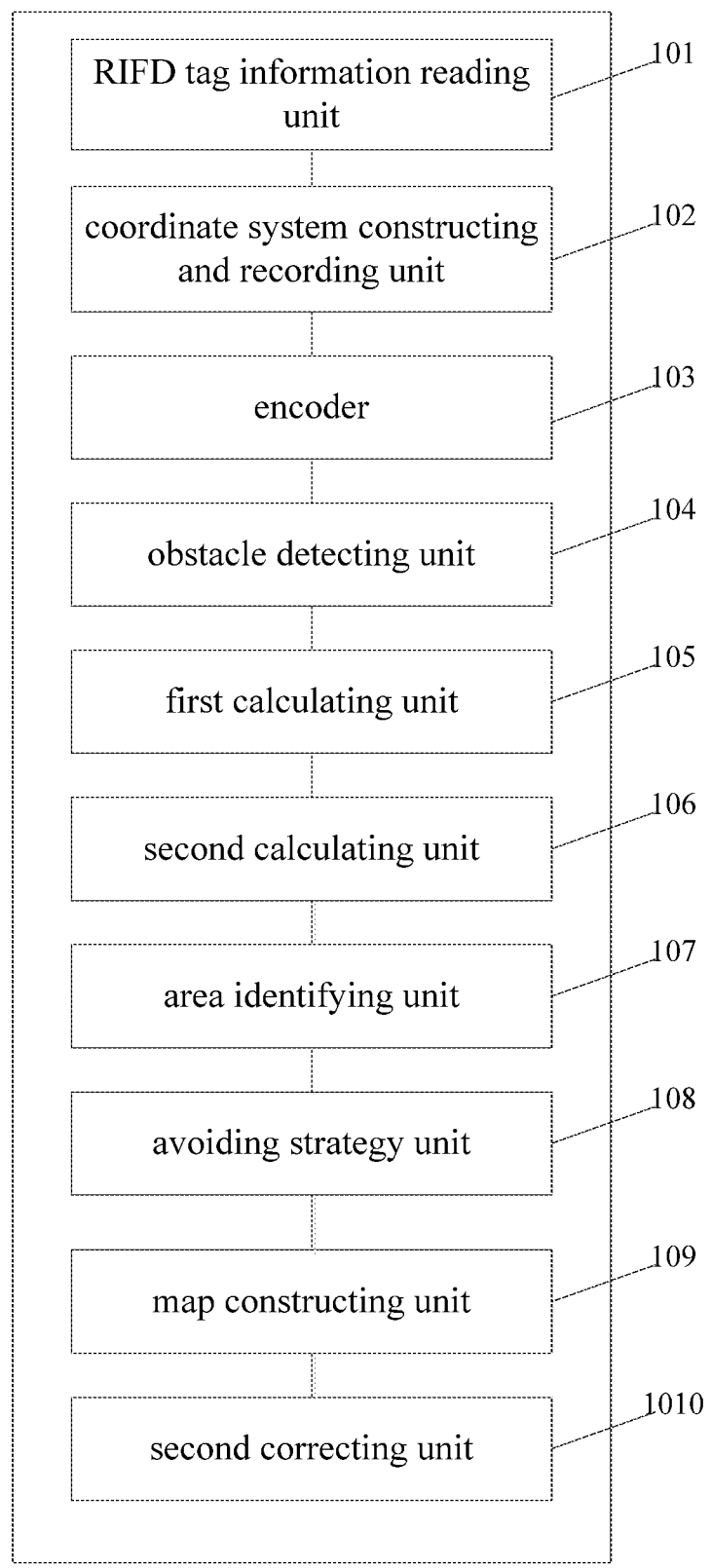
FIG. 10 is a composition block diagram of an apparatus for localization and mapping based on RFID according to the tenth embodiment of the present invention.

Referring to FIG. 10, it is a composition block diagram of an apparatus for localization and mapping based on RFID according to the tenth embodiment of the present invention. The apparatus is mobile electronic device or installed in a mobile electronic device, which is applicable for real-time mapping of an area to be localized in which two or more RFID tags are arranged. Wherein each RFID tag is correspondingly arranged at a specific position of the area to be localized, and information of each RFID tag comprises unique coding information used for distinguishing an absolute position thereof and area coding information used for distinguishing an accessible area/a no-entry area, wherein a RFID tag with the area coding information of the no-entry area limits the specific area behind the boundary where the RFID tag is localized as the no-entry area. The mobile electronic device can be, for example, a robot.

The apparatus for localization and mapping based on RFID comprises:

a RFID tag information reading unit 101, configured to read information of the RFID tag;

a coordinate system constructing and recording unit 102, configured to take a location of a first RFID tag as a coordinate origin of a coordinate system when information of the first RFID tag is obtained by the RFID tag information reading unit 101 in the mobile electronic device which is moving along a certain trajectory for a first time, and record the information of the first RFID tag and coordinate values thereof;

an encoder 103, configured to record a moving distance and a moving direction of the mobile electronic device relative to a starting point in real time when the mobile electronic device traverses the area to be localized with the coordinate origin as the starting point;

an obstacle detecting unit 104, configured to detect obstacle;

a first calculating unit 105, configured to calculate coordinate values of a location of each said obstacle based on a moving direction and a moving distance of the mobile electronic device relative to the starting point recorded by the encoder 103 when the mobile electronic device detects the obstacle, and send calculated coordinate values to the coordinate system constructing and recording unit 102;

a second calculating unit 106, configured to calculate coordinate values of location of other RFID tag except the first RFID tag each time the mobile electronic device obtains information of the other RFID tag based on a moving direction and a moving distance of the mobile electronic device relative to the starting point recorded in the encoder 103, and send information of the other RFID tag and the corresponding coordinate values to the coordinate system constructing and recording unit 102;

an area identifying unit 107, configured to identify the area coding information in the information of the RFID tag as the accessible area or as the no-entry area when the RFID tag information reading unit 101 obtains the information of each said RFID tag;

an avoiding strategy unit 108, configured to enable the mobile electronic device to continue to move on to avoid the no-entry area according to a preset avoiding strategy if the area coding information is identified as the no-entry area by the area identifying unit 107;

a map constructing unit 109, configured to construct a map according to the information of the RFID tags and coordinate values thereof and the coordinate values of the location of each said obstacle recorded by the coordinate system constructing and recording unit 102, and make marks of the accessible area/the no-entry area on the map being constructed according to the area coding information of each RFID tag;

a second correcting unit 1010, configured to correct the coordinate values of each RFID tag by using a correction algorithm after the mobile electronic device traverses the area to be localized for multiple times with the coordinate origin as the starting point according to the coordinate values of each RFID tag obtained from traversal for each time, and send corrected coordinate values to the map constructing unit 109 to correct constructed map.

The present embodiment adds the second correcting unit 1010 on the basis of the eighth embodiment, according to which the coordinate values of each RFID tag are obtained for multiply times in the way that the mobile device traverses for multiply times, and then the coordinate values of each RFID tag are corrected by the recursive algorithm. The more times the mobile device traverses for, the more accurate the calculated coordinate values of the RFID tag will be, until the final error will be reduced to negligible. Finally, the constructed map is corrected based on the corrected coordinate values. Thereby exiting cumulative errors from the mobile device traversing for one time are eliminated, and the accuracy of the constructed map is improved.

The embodiment of the present invention further discloses an intelligent mobile device, which is comprising a mobile apparatus and the apparatus for localization and mapping based on RFID as shown in FIG. 5-FIG. 10. The intelligent mobile device is preferably a robot.

It should be explained that according to the present description, the term "comprise", "include" or any other variant thereof which is intended to encompass the non-exclusive, so that the process, method, objects or apparatus comprising a series of elements includes not only those elements, but also includes other elements which are not explicitly listed, or further includes the elements that are inherent in such processes, methods, objects or devices. In the absence of more restrictions, the elements defined by the statements "comprise . . . " do not preclude the presence of additional identical elements in the process, methods, objects or devices that includes the listed elements.

Finally, it should be noted as well that the above-mentioned series of processing includes not only the processing performed according to time sequence in the order described herein, but also the processing performed in parallel or separately, rather than in chronological order. With the description of the above embodiments, it will be apparent to persons having ordinary skill in the art that the present invention may be implemented by means of software and necessary hardware platforms, and may be implemented only by software for sure. Based on this understanding, all or parts of the technical solution of the present invention that contributes to the background art may be embodied in the form of software product, which can be stored in a storage medium such as ROM/RAM, magnetic disk, optical disk and so on, which is including a number of instructions for enabling a computer device (which may be a personal computer, a server, or a network device and so on) to perform the methods described in certain parts of the embodiments or each embodiment of the present invention.

The foregoing descriptions are merely exemplary embodiments of the present invention, but are not intended to limit the present disclosure. Any modifications, equivalent substitutions, and improvements made by those skilled in the art within the spirit and principle of the present disclosure shall fall within the protection scope of the present disclosure.

What is claimed is:

1. A method for localization and mapping based on Radio Frequency Identification (RFID), wherein the method is applicable for real-time mapping of an area to be localized in which two or more RFID tags are arranged, each RFID tag is correspondingly arranged at a specific position of the area to be localized, and information of each said RFID tag comprises unique coding information used for distinguishing an absolute position thereof, and the method comprises steps of:

taking a location of a first RFID tag as a coordinate origin of a coordinate system when information of the first RFID tag is obtained by a mobile electronic device which is moving along a certain trajectory for a first time, and recording the information of the first RFID tag and coordinate values thereof;

moving the mobile electronic device with the coordinate origin as a starting point to traverse the area to be localized, calculating and recording coordinate values of a location of an obstacle based on a moving direction and a moving distance of the mobile electronic device relative to the starting point each time the mobile electronic device detects the obstacle during the traversal;

calculating coordinate values of location of other RFID tag except the first RFID tag each time the mobile electronic device obtains information of the other RFID tag based on a moving direction and a moving distance of the mobile electronic device relative to the starting point during the traversal, and recording the information of the other RFID tag and corresponding coordinate values; and constructing a map according to recorded information of the RFID tags and coordinate values thereof and the coordinate values of the location of each said obstacle when the traversal has been finished;

wherein the information of each said RFID tag further comprises area coding information used for distinguishing an accessible area/a no-entry area, and a RFID tag with the area coding information of the no-entry area limits a specific area behind a boundary where the RFID tag is localized as the no-entry area, the method further comprises step of:

identifying the area coding information in the information of the RFID tag as the accessible area or as the no-entry area firstly when the mobile electronic device obtains the information of the RFID tag, and then enabling the mobile electronic device to continue to move on to avoid the no-entry area according to a preset avoiding strategy if the no-entry area is identified.

2. The method for localization and mapping based on RFID according to claim 1, wherein after constructing the map, the method further comprises steps of:

enabling the mobile electronic device to traverse the area to be localized for multiple times with the coordinate origin as the starting point, and correcting the coordinate values of each said RFID tag by using a correction algorithm based on the coordinate values of each said RFID tag obtained from traversal for each time; and correcting the constructed map based on corrected coordinate values.

3. The method for localization and mapping based on RFID according to claim 1, wherein when the traversal has been finished, during the map-constructing process based on recorded information of the RFID tags and the coordinate values thereof and the coordinate values of the location of each obstacle, making marks of the accessible area/no-entry area on the map being constructed according to the area coding information of each said RFID tag.

4. The method for localization and mapping based on RFID according to claim 1, wherein the coordinate values of the location of the obstacle are calculated each time the mobile electronic device detects the obstacle in the following manners:

sensing the obstacle by using a collision sensor, and taking coordinate values of the mobile electronic device as the coordinate values of the location of the obstacle when the collision sensor senses a collision with the obstacle; or detecting the obstacle by using a laser sensor/an infrared sensor, and calculating the location of the obstacle relative to a current location of the mobile electronic device according to a calculation principle of laser/infrared distance when the laser sensor/the infrared sensor detects the obstacle, thus calculating the coordinate values of the location of the obstacle.

5. The method for localization and mapping based on RFID according to claim 1, wherein the method further comprises step of: correcting each said moving direction and each said moving distance of the mobile electronic device relative to the starting point based on an angular velocity or/and an angle and an acceleration of the mobile electronic device; and coordinate values are obtained according to corrected moving direction and corrected moving distance of the mobile electronic device relative to the starting point.

6. The method for localization and mapping based on RFID according to claim 1, employing passive RFID tags as the RFID tags, and limiting that only when the mobile electronic device is closest to one of the RFID tags can the mobile electronic device obtain the information of the RFID tag, and taking a location of the mobile electronic device where the mobile electronic device obtains the information of the RFID tag as the location of the RFID tag.

7. The method for localization and mapping based on RFID according to claim 1, wherein the location of each said RFID tag is determined in the following manners:

employing active RFID tags as the RFID tags, when the mobile electronic device has sensed the information of any one of the RFID tags, enabling the mobile electronic device to move in a direction in which RSSI of the RFID tag is gradually increasing until RSSI of the RFID tag sensed by the mobile electronic device is equal to or greater than a preset maximum RSSI value or the mobile electronic device collides with the RFID tag, and then taking a location of the mobile electronic device as the location of the RFID tag.

8. The method for localization and mapping based on RFID according to claim 1, wherein the method further comprises steps of:

when the mobile electronic device has collided with an obstacle during the traversal, enabling the mobile electronic device to continue to advance to avoid the obstacle according to a preset collision strategy;

the preset collision strategy is:

enabling the mobile electronic device to retreat by M cm and rotate to the left/right by N° when a collision occurs, wherein 0<M<20, 0<N<10;

the preset avoiding strategy comprises:

enabling the mobile electronic device to retreat by P cm and rotate to the left/right by Q° when the no-entry area is identified, wherein P is not less than a length of the boundary, 45≤Q≤90.

9. The method for localization and mapping based on RFID according to claim 1, wherein the method is applicable for real-time mapping for an indoor area to be localized; the RFID tag is arranged on a left and/or right side wall of a door frame.

10. An apparatus for localization and mapping based on Radio Frequency Identification (RFID), wherein the apparatus is applicable for real-time mapping of an area to be localized in which two or more RFID tags are arranged, each RFID tag is correspondingly arranged at a specific position of the area to be localized, and information of each said RFID tag comprises unique coding information used for distinguishing an absolute position thereof, the apparatus for localization and mapping is a mobile electronic device and the mobile electronic device comprises:

a RFID tag information reading unit, configured to read information of the RFID tag;

a coordinate system constructing and recording unit, configured to take a location of a first RFID tag as a coordinate origin of a coordinate system when information of the first RFID tag is obtained by the RFID tag information reading unit in the mobile electronic device which is moving along a certain trajectory for a first time, and record the information of the first RFID tag and coordinate values thereof;

an encoder, configured to record a moving distance and a moving direction of the mobile electronic device relative to a starting point in real time when the mobile electronic device traverses the area to be localized with the coordinate origin as the starting point;

an obstacle detecting unit, configured to detect obstacle;

a first calculating unit, configured to calculate coordinate values of a location of each said obstacle based on a moving direction and a moving distance of the mobile electronic device relative to the starting point recorded by the encoder when the mobile electronic device detects the obstacle, and send the calculated coordinate values to the coordinate system constructing and recording unit; and a map constructing unit, configured to construct a map according to the information of the RFID tags and coordinate values thereof and the coordinate values of the location of each said obstacle recorded by the coordinate system constructing and recording unit;

wherein the apparatus further comprises:

a second calculating unit, configured to calculate coordinate values of location of other RFID tag except the first RFID tag each time the mobile electronic device obtains information of the other RFID tag based on a moving direction and a moving distance of the mobile electronic device relative to the starting point during the traversal, and send the information of the other RFID tag and corresponding coordinate values to the coordinate system constructing and recording unit;

wherein the information of each said RFID tag further comprises area coding information used for distinguishing an accessible area/a no-entry area, and a RFID tag with the area coding information of the no-entry area limits a specific area behind a boundary where the RFID tag is localized as the no-entry area, the apparatus further comprises:

an area identifying unit, configured to identify the area coding information in information of the RFID tag as the accessible area or as the no-entry area when the mobile electronic device obtains the information of each said RFID tag; and an avoiding strategy unit, configured to enable the mobile electronic device to continue to move on to avoid the no-entry area according to a preset avoiding strategy if the area coding information is identified as the no-entry area by the area identifying unit.

11. The apparatus for localization and mapping based on RFID according to claim 10, wherein the apparatus further comprises:

a second correcting unit, configured to correct the coordinate values of each said RFID tag by using a correction algorithm after the mobile electronic device traverses the area to be localized for multiple times with the coordinate origin as the starting point according to the coordinate values of each said RFID tag obtained from traversal for each time, and send corrected coordinate values to the map constructing unit to correct constructed map.

12. The apparatus for localization and mapping based on RFID according to claim 10, wherein after finishing the traversal, during the map-constructing process based on recorded information of the RFID tags and the coordinate values thereof and the coordinate values of the location of each obstacle, the map constructing unit makes marks of the accessible area/no-entry area on the map being constructed according to the area coding information of each said RFID tag.

13. The apparatus for localization and mapping based on RFID according to claim 10, wherein the obstacle detecting unit comprises a collision sensor, a laser sensor or an infrared sensor;

and the first calculating unit takes calculated coordinate values of a current location of the mobile electronic device as the coordinate values of the location of an obstacle when the collision sensor senses a collision with the obstacle;

the laser sensor/the infrared sensor calculates the location of the obstacle relative to a current location of the mobile electronic device according to a calculation principle of laser/infrared distance when the laser sensor/infrared sensor detects the obstacle, which is send to the first calculating unit; the first calculating unit calculates the coordinate values of the location of the obstacle based on the calculated coordinate values of the current location of the mobile electronic device and the location of the obstacle relative to the current location of the mobile electronic device.

14. The apparatus for localization and mapping based on RFID according to claim 10, wherein the apparatus further comprises:

a gyro sensor or/and an electronic compass and an accelerometer, configured to record an angular velocity or/and an angle and an acceleration of the mobile electronic device in real time respectively when the mobile electronic device traverses the area to be localized with the coordinate origin as the starting point; and a first correcting unit, configured to correct each said moving direction and each said moving distance of the mobile electronic device relative to the starting point based on the angular velocity or/and the angle and the acceleration of the mobile electronic device;

the first calculating unit calculates the coordinate values of the location of each obstacle according to corrected moving direction and corrected moving distance of the mobile electronic device relative to the starting point.

15. The apparatus for localization and mapping based on RFID according to claim 10, wherein the apparatus further comprises:
- a gyro sensor or/and an electronic compass and an accelerometer, configured to record an angular velocity or/and an angle and an acceleration of the mobile electronic device in real time respectively when the mobile electronic device traverses the area to be localized with the coordinate origin as the starting point; and
- a first correcting unit, configured to correct each said moving direction and each said moving distance of the mobile electronic device relative to the starting point based on the angular velocity or/and the angle and the acceleration of the mobile electronic device;
- the first calculating unit calculates the coordinate values of each obstacle according to corrected moving direction and corrected moving distance of the mobile electronic device relative to the starting point;
- the second calculating unit calculates the coordinate values of the locations of the other RFID tag according to the corrected moving direction and the corrected moving distance of the mobile electronic device relative to the starting point.

16. The apparatus for localization and mapping based on RFID according to claim 10, employing passive RFID tags as the RFID tags, and limiting that only when the mobile electronic device is closest to one of the RFID tags can the mobile electronic device obtain the information of the RFID tag, and taking a location of the mobile electronic device where the mobile electronic device obtains the information of the RFID tag as the location of the RFID tag; or
- employing active RFID tags as the RFID tags, when the mobile electronic device has sensed the information of one of the RFID tags, enabling the mobile electronic device to move in a direction in which RSSI of the RFID tag is gradually increasing until RSSI of the RFID tag sensed by the mobile electronic device is equal to or greater than a preset maximum RSSI value or the mobile electronic device collides with the RFID tag, and then taking a location of the mobile electronic device as the location of the RFID tag.

17. The apparatus for localization and mapping based on RFID according to claim 10, wherein the apparatus further comprises:
- a collision strategy unit, configured to enable the mobile electronic device to continue to advance to avoid an obstacle when the mobile electronic device has collided with the obstacle during the traversal according to a preset collision strategy;
- the preset collision strategy is:
- enabling the mobile electronic device to retreat by M cm and rotate to the left/right by N° when a collision occurs, wherein $0<M<20$, $0<N<10$;
- the preset avoiding strategy comprises:
- enabling the mobile electronic device to retreat by P cm and rotate to the left/right by Q° when the no-entry area is identified, wherein P is not less than a length of the boundary, $45 \leq Q \leq 90$.

18. The apparatus for localization and mapping based on RFID according to claim 10, wherein the apparatus is applicable for real-time mapping for an indoor area to be localized; the RFID tag is arranged on a left and/or right side wall of a door frame of a room; or, a fixing groove is arranged on a left side and/or right side wall of a door frame, and the RFID tag is set in the fixing groove.

19. An intelligent mobile device, wherein the intelligent mobile device comprises a mobile apparatus and the apparatus for localization and mapping based on RFID as claimed in claim 10.

* * * * *